United States Patent
Park et al.

(10) Patent No.: US 10,206,132 B2
(45) Date of Patent: Feb. 12, 2019

(54) METHOD AND APPARATUS FOR PERFORMING MEASUREMENT USING DISCOVERY REFERENCE SIGNAL (DRS) IN WIRELESS COMMUNICATION SYSTEM

(71) Applicant: LG ELECTRONICS INC., Seoul (KR)

(72) Inventors: Jonghyun Park, Seoul (KR); Joonkui Ahn, Seoul (KR); Yunjung Yi, Seoul (KR); Kijun Kim, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 15/314,398

(22) PCT Filed: May 20, 2015

(86) PCT No.: PCT/KR2015/005046
§ 371 (c)(1),
(2) Date: Nov. 28, 2016

(87) PCT Pub. No.: WO2015/182915
PCT Pub. Date: Dec. 3, 2015

(65) Prior Publication Data
US 2017/0201898 A1    Jul. 13, 2017

Related U.S. Application Data

(60) Provisional application No. 62/003,035, filed on May 27, 2014, provisional application No. 62/004,194, (Continued)

(51) Int. Cl.
H04W 24/08    (2009.01)
H04W 16/32    (2009.01)
(Continued)

(52) U.S. Cl.
CPC .......... H04W 24/08 (2013.01); H04L 5/0048 (2013.01); H04W 16/32 (2013.01); H04W 72/0446 (2013.01); H04L 5/0091 (2013.01)

(58) Field of Classification Search
CPC .. H04W 24/08; H04W 72/0446; H04L 5/0048
See application file for complete search history.

(56) References Cited

U.S. PATENT DOCUMENTS 9,332,505 B2 *    5/2016    Siomina ................ H04W 52/18
2010/0273506 A1 *    10/2010    Stern-Berkowitz ..........
G01S 5/0009
455/456.1
(Continued)

FOREIGN PATENT DOCUMENTS

CN    103685120 A    3/2014

OTHER PUBLICATIONS

Nvidia (R2-142694, Small cell on/off and discovery considerations, May 19-23, 2014, Seoul Korea). (Year: 2014).*
(Continued)

*Primary Examiner* — Maharishi V Khirodhar
(74) *Attorney, Agent, or Firm* — Birch, Stewart, Kolasch & Birch, LLP

(57) ABSTRACT

According to an aspect of the present disclosure, a method for performing a measurement through a Discovery Reference Signal (DRS) performed by a user equipment (UE) in a wireless communication system includes receiving DRS Measurement Timing Configuration (DMTC) information in relation to a DRS measurement time from a base station (BS) in order to perform a measurement using the DRS; receiving the DRS from one or more cells in a specific carrier frequency based on the received DRS Measurement
(Continued)

Timing Configuration information; performing a measurement through the received DRS; and reporting the measurement result to the BS.

10 Claims, 19 Drawing Sheets

Related U.S. Application Data filed on May 28, 2014, provisional application No. 62/039,879, filed on Aug. 20, 2014.

(51) Int. Cl.
*H04L 5/00* (2006.01)
*H04W 72/04* (2009.01)

(56) References Cited

U.S. PATENT DOCUMENTS

| | | | |
|---|---|---|---|
| 2011/0103251 A1* | 5/2011 | Ma | H04W 72/005 370/252 |
| 2012/0188988 A1 | 7/2012 | Chung et al. | |
| 2014/0064133 A1* | 3/2014 | Kazmi | H04W 24/10 370/252 |
| 2014/0133395 A1 | 5/2014 | Nam et al. | |
| 2014/0328327 A1* | 11/2014 | Xiao | H04W 36/30 370/332 |
| 2016/0262100 A1* | 9/2016 | Larsson | H04W 52/0229 |

OTHER PUBLICATIONS

Huawei (R1-141589,Mechanisms for energy efficient small cell discovery and measurements, Mar. 31-Apr. 4, 2014, Shenzhen, China). (Year: 2014).*

Huawei et al., "Summary of performance evaluations of DRS", R1-141934, 3GPP TSG RAN WG1 Meeting #77, Seoul, Korea, May 19-23, 2014, 7 Pages. (http://www.3gpp.org/ftp/tsg_ran/WG1_RL1/TSGR1_77/Docs/), See p. 1.

Huawei et al., "UE monitoring behavior with DRS configurations", R1-141123, 3GPP TSG RAN WG1 Meeting #76bis, Shenzhen, China, Mar. 31-Apr. 4, 2014, 6 pages. (http://www.3gpp.org/ftp/tsg_ran/wg1_rl1/TSGR1_76b/Docs/), See section 2, 2.3.

LG Electronics et al., "Offline discussion summary for discovery signals details", R1-142718, 3GPP TSG RAN WG1 #77, Seoul, Korea, May 19-23, 2014, 4 Pages. (http://www.3gpp.org/ftp/tsg_ran/WG1_RL1/TSGR1_77/Docs/), See p. 4.

NEC, "Views on DRS measurement timing configuration", R1-142168, 3GPP TSG RAN WG1 Meeting #77, Seoul, Korea, May 19-23, 2014, 3 Pages. http://www.3gpp.org/ftp/tsg_ran/wg1_rl1/TSGR1_77/Docs/ See section 1, 2.2.

NTT Docomo et al., "WF on higher layer signaling for NAICS", R1-142681, 3GPP TSG-RAN WG1 #77, Seoul, Korea, May 22, 2014, 49 Pages. (http://www.3gpp.org/ftp/tsg_ran/WG1_RL1/TSGR1_77/Docs/), See slide 2.

* cited by examiner

METHOD AND APPARATUS FOR PERFORMING MEASUREMENT USING DISCOVERY REFERENCE SIGNAL (DRS) IN WIRELESS COMMUNICATION SYSTEM

CROSS REFERENCE TO RELATED APPLICATIONS

This application is the National Phase of PCT International Application No. PCT/KR2015/005046, filed on May 20, 2015, which claims priority under 35 U.S.C. 119(e) to U.S. Provisional Application Nos. 62/003,035, filed on May 27, 2014, 62/004,194 filed on May 28, 2014 and 62/039,879 filed on Aug. 20, 2014, all of which are hereby expressly incorporated by reference into the present application.

TECHNICAL FIELD

The present invention relates to wireless communication systems, and more particularly, to a method for performing a measurement based on a discovery reference signal (DRS) in a wireless communication system and an apparatus for supporting the same.

BACKGROUND ART

The mobile communication system is developed to provide the voice service while guaranteeing the activity of a user. However, the mobile communication system is extended to the data service in addition to the voice service. Currently, since the shortage of resource is caused owing to the explosive traffic increase and users requires higher services, more developed mobile communication system is needed.

The requirement for the next mobile communication system should support the acceptance of explosive data traffic increase, the innovative increase of transmission rate per user, the acceptance of the number of connection devices which are dramatically increased, very low End-to-End Latency, high energy efficiency. To this end, various techniques have been researched such as the Dual Connectivity, the Massive Multiple Input Multiple Output (Massive MIMO), the In-band Full Duplex, the Non-Orthogonal Multiple Access (NOMA), the Super wideband support, the Device Networking, and so on.

DISCLOSURE

Technical Problem

The small cell enhancement technique supports the small cell on/off mechanism in order to save the energy of the small cell and to decrease the interference on a neighbor cell. In order to determine the state of small cell in a user equipment, the small cell broadcasts a discovery signal periodically regardless of the on/off state.

In order to solve the problem above, an object of the present disclosure is to provide a method for performing a measurement based on the discovery signal on the basis of the information in relation to a discovery measurement time, and for reporting the measurement result.

In addition, an object of the present disclosure is to provide a method for performing an accurate DRS measurement by identifying whether the subframe on which the DRS is transmitted and received is an MBSFN subframe based on MBSFN subframe configuration information of a neighbor cell.

In addition, an object of the present disclosure is to provide a method for constructing the information related to the MBSFN subframe configuration of a neighbor cell as the bitmap of simpler form and for transmitting it to a user equipment.

The technical objects to attain in the present invention are not limited to the above-described technical objects and other technical objects which are not described herein will become apparent to those skilled in the art from the following description.

Technical Solution

According to an aspect of the present disclosure, a method for performing a measurement through a Discovery Reference Signal (DRS) performed by a user equipment (UE) in a wireless communication system includes receiving DRS Measurement Timing Configuration (DMTC) information in relation to a DRS measurement time from a base station (BS) in order to perform a measurement using the DRS; receiving the DRS from one or more cells in a specific carrier frequency based on the received DRS Measurement Timing Configuration information; performing a measurement through the received DRS; and reporting the measurement result to the BS, where the DRS Measurement Timing Configuration information includes at least one of DRS measurement duration information that represents a length of DRS measurement window, DRS measurement offset information that represents a starting point of the DRS measurement window or DRS measurement period information that represents an occurrence period of the DRS measurement window.

In addition, in the present disclosure, the DRS Measurement Timing Configuration information further includes DRS occasion information that represents a duration in which the DRS is transmitted or received within the DRS measurement window.

In addition, in the present disclosure, the DRS Measurement Timing Configuration information is received from the BS with being configured for each cell and/or each carrier frequency.

In addition, in the present disclosure, the method further includes receiving MBMS Single-Frequency Network (MBSFN) subframe configuration information in relation to an MBSFN subframe configuration for the one or more cells.

In addition, in the present disclosure, the MBSFN subframe configuration information is information representing whether a subframe in the DRS measurement window is MBSFN subframe or non-MBSFN subframe.

In addition, in the present disclosure, the DRS is received in the non-MBSFN subframe through multiple symbols, and wherein the DRS is received in the MBSFN subframe through only a single symbol.

In addition, in the present disclosure, the MBSFN subframe configuration information is included in neighbor cell configuration (NeighCellConfig) information.

In addition, in the present disclosure, the neighbor cell configuration (NeighCellConfig) information is transmitted through System Information Block (SIB) 3, SIB 5 or MeasObjectEUTRA.

In addition, in the present disclosure, the method further includes receiving Indication of DRS Measurement Symbol (IDMS) information indicating a DRS measurement symbol from the BS.

In addition, in the present disclosure, the Indication of DRS Measurement Symbol information is expressed by a bitmap form.

In addition, in the present disclosure, each bit value of the Indication of DRS Measurement Symbol information corresponds to each of subframes within the DRS measurement window.

In addition, in the present disclosure, the Indication of DRS Measurement Symbol information does not include a bit value corresponding to a subframe on which synchronization signal is received.

In addition, in the present disclosure, each bit value of the Indication of DRS Measurement Symbol information represents whether a subframe corresponding to the each bit value is MBSFN subframe or non-MBSFN subframe.

In addition, in the present disclosure, the Indication of DRS Measurement Symbol information is received separately from the MBSFN subframe configuration information.

In addition, in the present disclosure, the DRS is a signal for discover on/off state of the one or more cells, and is either one of Common Reference Signal (CRS) or Channel State Information-RS (CSI-RS).

According to another aspect of the present disclosure, a radio frequency (RF) unit for transmitting and receiving a radio signal; and a processor functionally connected to the RF unit and controlling the UE, wherein the processor is configured to perform: receiving DRS Measurement Timing Configuration (DMTC) information in relation to a DRS measurement time from a base station (BS) in order to perform a measurement using the DRS; receiving the DRS from one or more cells in a specific carrier frequency based on the received DRS Measurement Timing Configuration information; performing a measurement through the received DRS; and reporting the measurement result to the BS, where the DRS Measurement Timing Configuration information includes at least one of DRS measurement duration information that represents a length of DRS measurement window, DRS measurement offset information that represents a starting point of the DRS measurement window or DRS measurement period information that represents an occurrence period of the DRS measurement window.

Technical Effects

According to the present invention, in a wireless communication system, a user equipment may smoothly performs a measurement based on the discovery signal and report the measurement result.

In addition, according to the present invention, there is an effect of preventing a user equipment from performing unnecessary DRS measurement by accurately acquiring the subframe and/or the symbol on which the DRS is transmitted and received based on the MBSFN subframe configuration information of a neighbor cell.

In addition, according to the present invention, there is an effect of efficiently using resource by constructing the information related to the MBSFN subframe configuration of a neighbor cell as the bitmap of simpler form.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

BEST MODE FOR INVENTION

Figure 1:
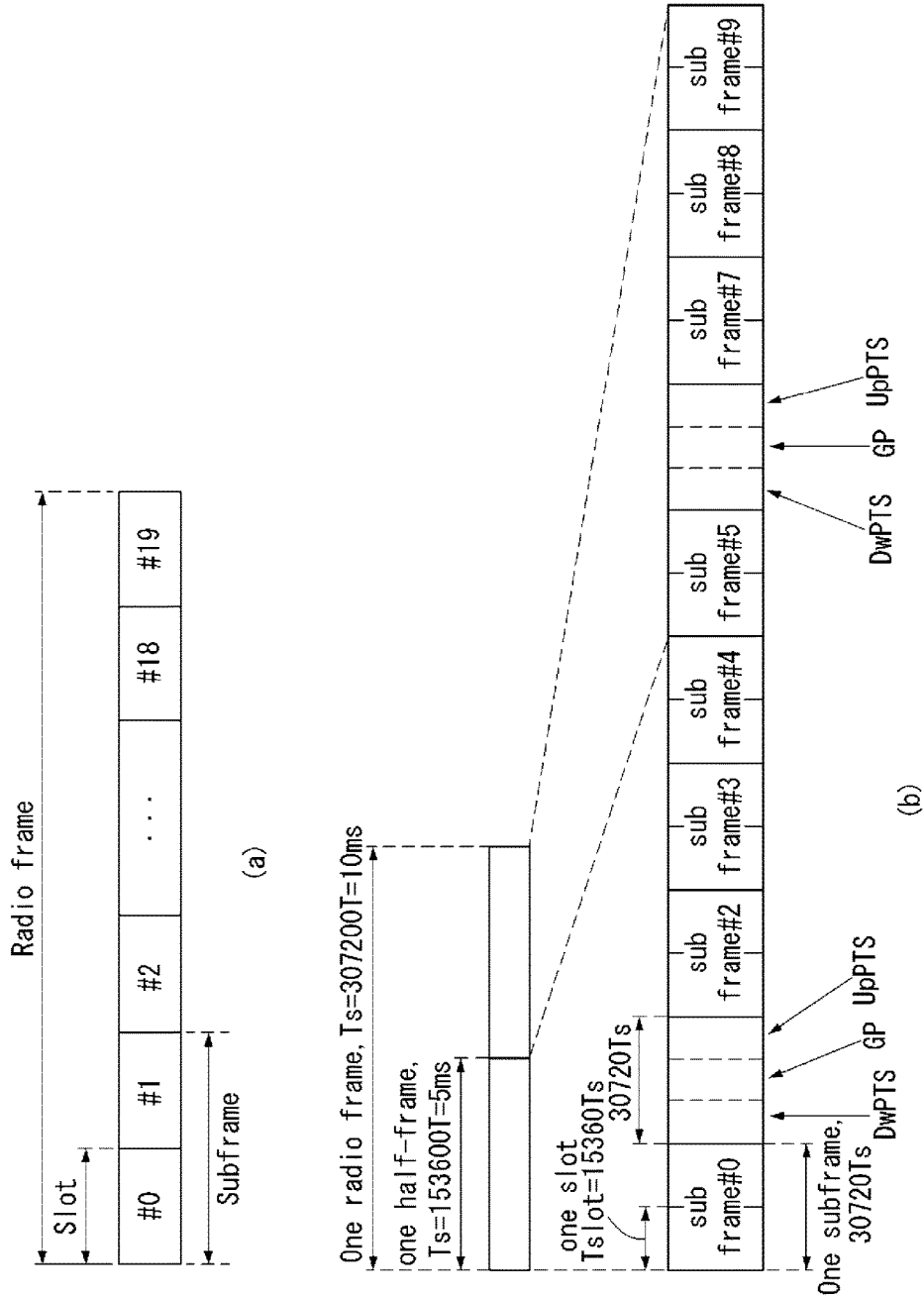
FIG. 1 illustrates the structure of a radio frame in a wireless communication system to which the present invention may be applied.

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

Figure 2:
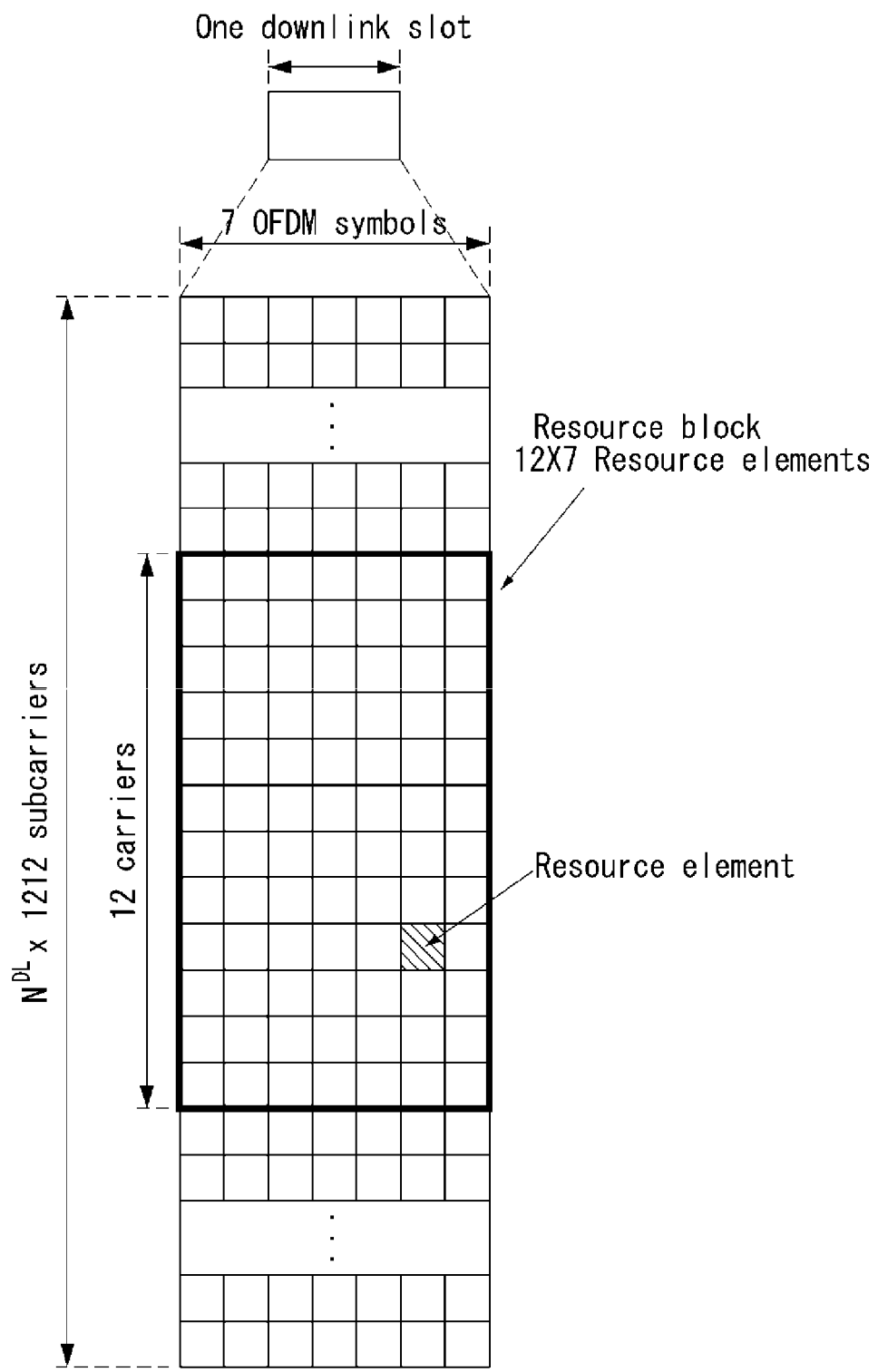
FIG. 2 is a diagram illustrating a resource grid for a downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
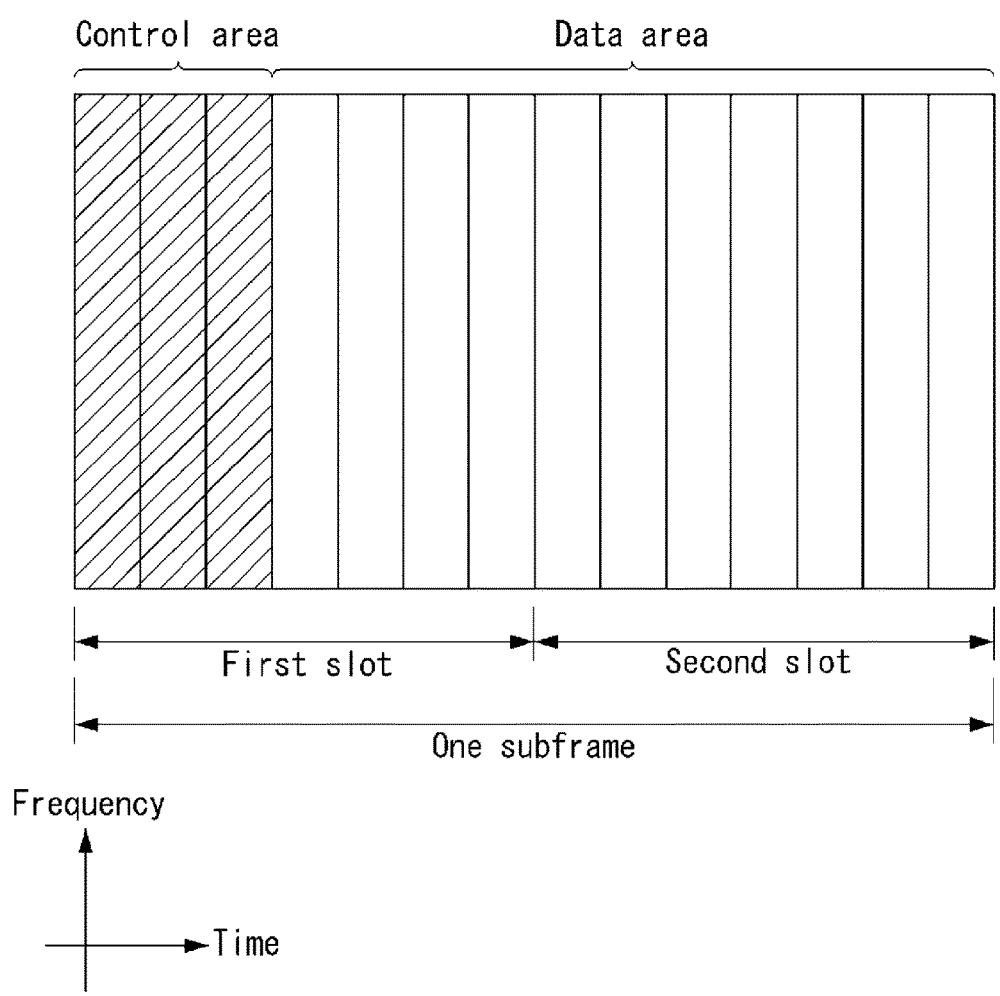
FIG. 3 illustrates a structure of downlink subframe in a wireless communication system to which the present invention may be applied.

FIG. 3 illustrates a structure of a downlink subframe in the wireless communication system to which the present invention can be applied.

Referring to FIG. 3, a maximum of three OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
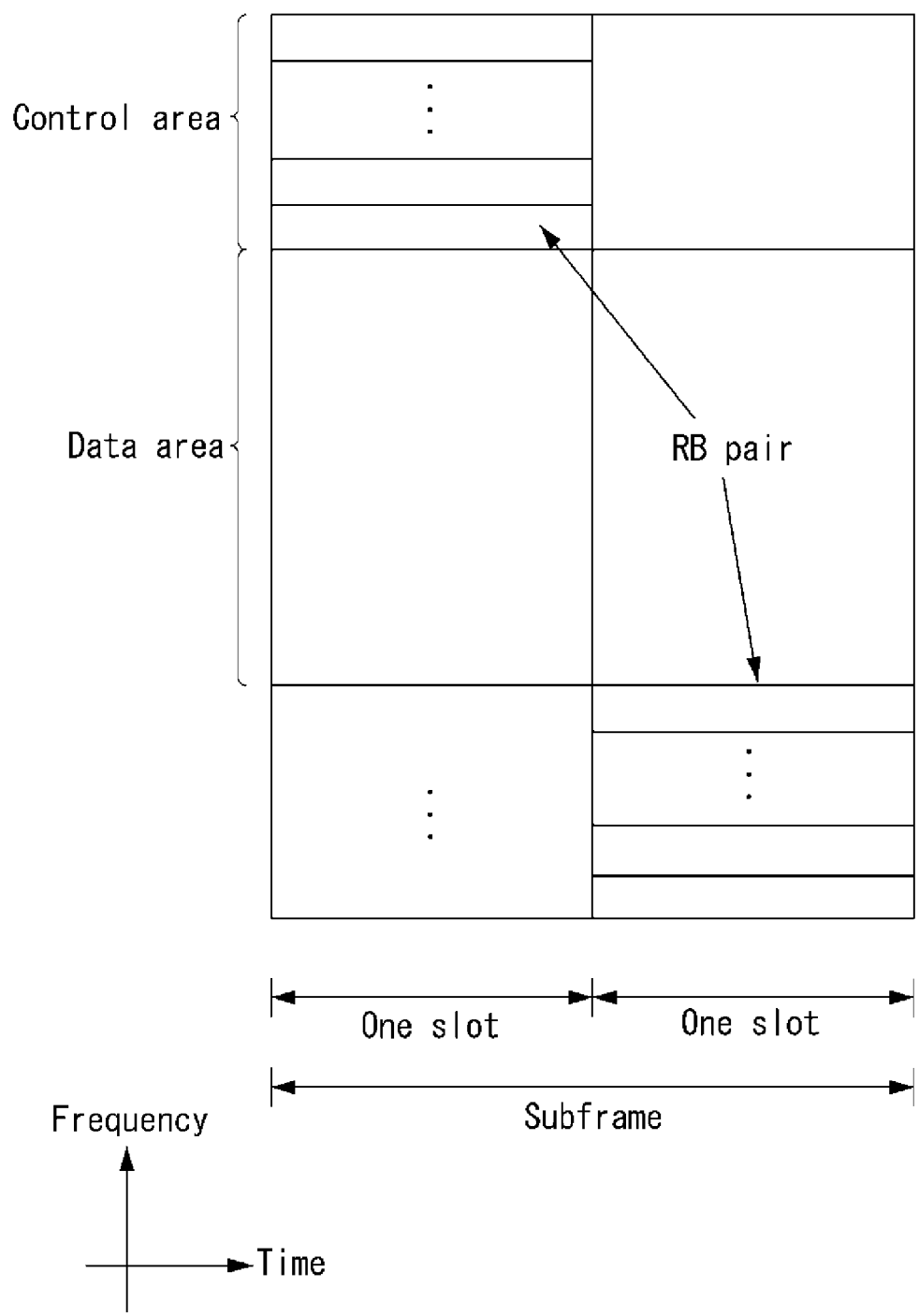
FIG. 4 illustrates a structure of uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

Figure 5:
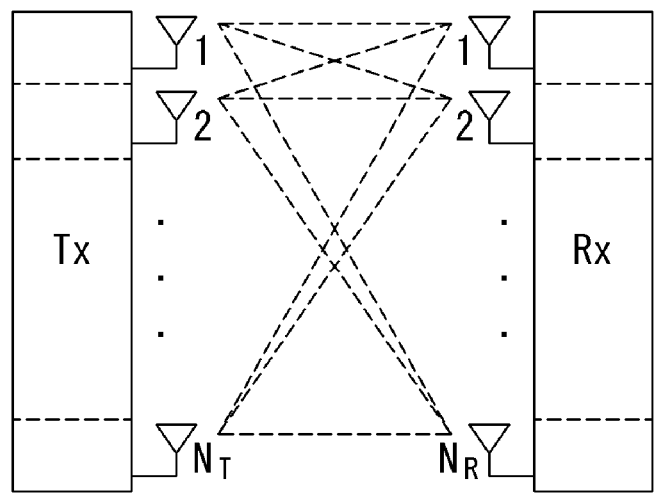
FIG. 5 shows the configuration of a known MIMO communication system.

FIG. 5 is a configuration diagram of a general multiple input multiple output (MIMO) communication system.

Referring to FIG. 5, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epochally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R)$$ [Equation 1]

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 5.

First, in respect to a transmission signal, when NT transmitting antennas are provided, since the maximum number of transmittable information is NT, NT may be expressed as a vector given below.

$$s = [s_1, s_2, \ldots, s_{N_T}]^T$$ [Equation 2]

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

Further, ŝ may be expressed as described below as a diagonal matrix P of the transmission power.

$$\lfloor 0 P_{N_T} \rfloor \lfloor s_{N_T} \rfloor$$ [Equation 4]

Meanwhile, the information vector ŝ of which the transmission power is adjusted is multiplied by a weight matrix W to constitute NT transmission signals x1, x2, . . . xNT which are actually transmitted. Herein, the weight matrix serves to appropriately distribute the transmission information to the respective antennas according to a transmission channel situation, and the like. The transmission signals x1, x2, ..., xNT may be expressed as below by using a vector x.

$$[x_{N_T}] [w_{N_T 1} w_{N_T 2} \ldots w_{N_T N_T}] [\hat{s}_{N_T}] \quad \text{[Equation 5]}$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, ..., yNR of the respective antennas are expressed as a vector y as described below.

$$y = [y_1, y_2, \ldots, y_{N_R}]^T \quad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

Figure 6:
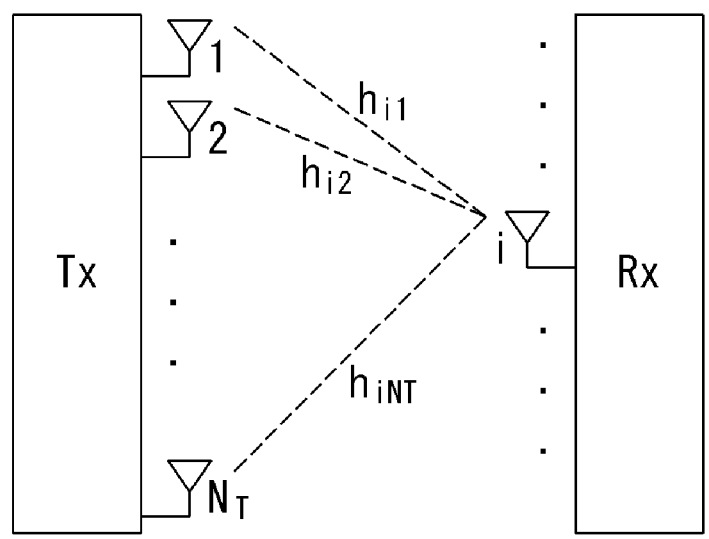
FIG. 6 is a diagram showing a channel from a plurality of transmission antennas to a single reception antenna.

FIG. 6 is a diagram illustrating a channel from multiple transmitting antennas to one receiving antenna.

As illustrated in FIG. 6, a channel which reaches receiving antenna I from a total of NT transmitting antennas may be expressed as below.

$$h_i^T = [h_{i1}, h_{i2}, \ldots, h_{iN_T}] \quad \text{[Equation 7]}$$

Further, all of channels passing through NR receiving antennas from NT transmitting antennas may be shown as below through matrix expression shown in Equation given above.

$$[h_{N_R}^T] [h_{N_R 1} h_{N_R 2} \ldots h_{N_R N_T}] \quad \text{[Equation 8]}$$

Meanwhile, since additive white Gaussian noise (AWGN) is added after passing through a channel matrix H given above in an actual channel, white noises n1, n2, ..., nNR added to NR receiving antennas, respectively are expressed as below.

$$n = [n_1, n_2, \ldots, n_{N_R}]^T \quad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$[y_{N_R}] [h_{N_R 1} h_{N_R 2} \ldots h_{N_R N_T}] [x_{N_T}] [n_{N_R}] \quad \text{[Equation 10]}$$

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R) \quad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRCConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 7:
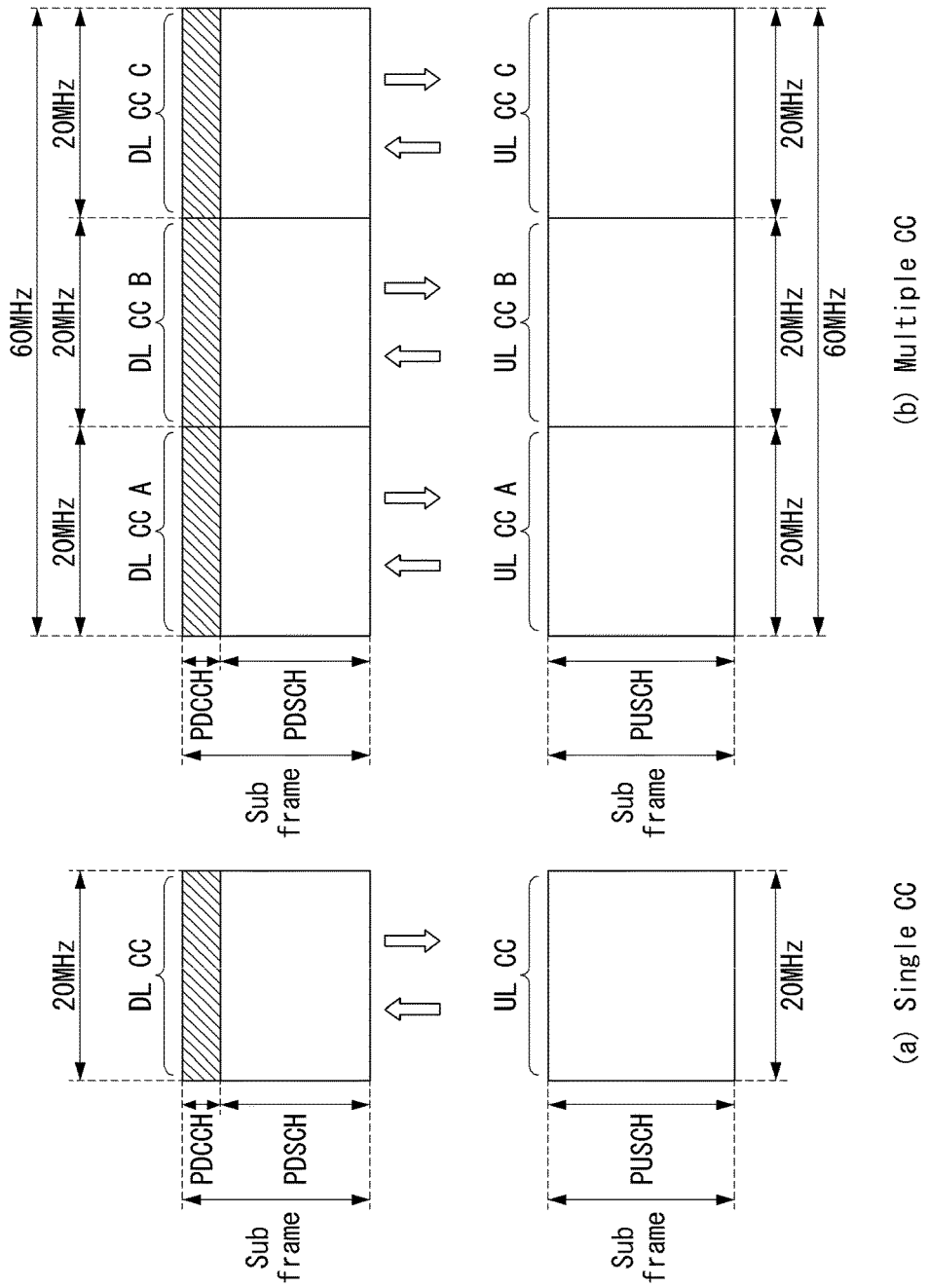
FIG. 7 shows an example of component carriers and a carrier aggregation in a wireless communication system to which an embodiment of the present invention may be applied.

FIG. 7 illustrates examples of a component carrier and carrier aggregation in the wireless communication system to which the present invention can be applied.

FIG. 7a illustrates a single carrier structure used in an LTE system. The component carrier includes the DL CC and the UL CC. One component carrier may have a frequency range of 20 MHz.

FIG. 7b illustrates a carrier aggregation structure used in the LTE system. In the case of FIG. 7b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Coordinated Multi-Point Transmission and Reception (COMP)

According to a demand of LTE-advanced, CoMP transmission is proposed in order to improve the performance of the system. The CoMP is also called co-MIMO, collaborative MIMO, network MIMO, and the like. It is anticipated that the CoMP will improves the performance of the terminal positioned at a cell edge and improve an average throughput of the cell (sector).

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise. That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

Hybrid-Automatic Repeat and Request (HARQ)

The LTE physical layer supports the HARQ in the PDSCH and the PUSCH, and transmits the related acknowledgement (ACK) feedback in a separate control channel.

In the LTE FDD system, eight Stop-And-Wait (SAW) HARQ processes are supported on both the uplink and the downlink in accordance with a constant round-trip time (RTT) of 8 ms.

Figure 8:
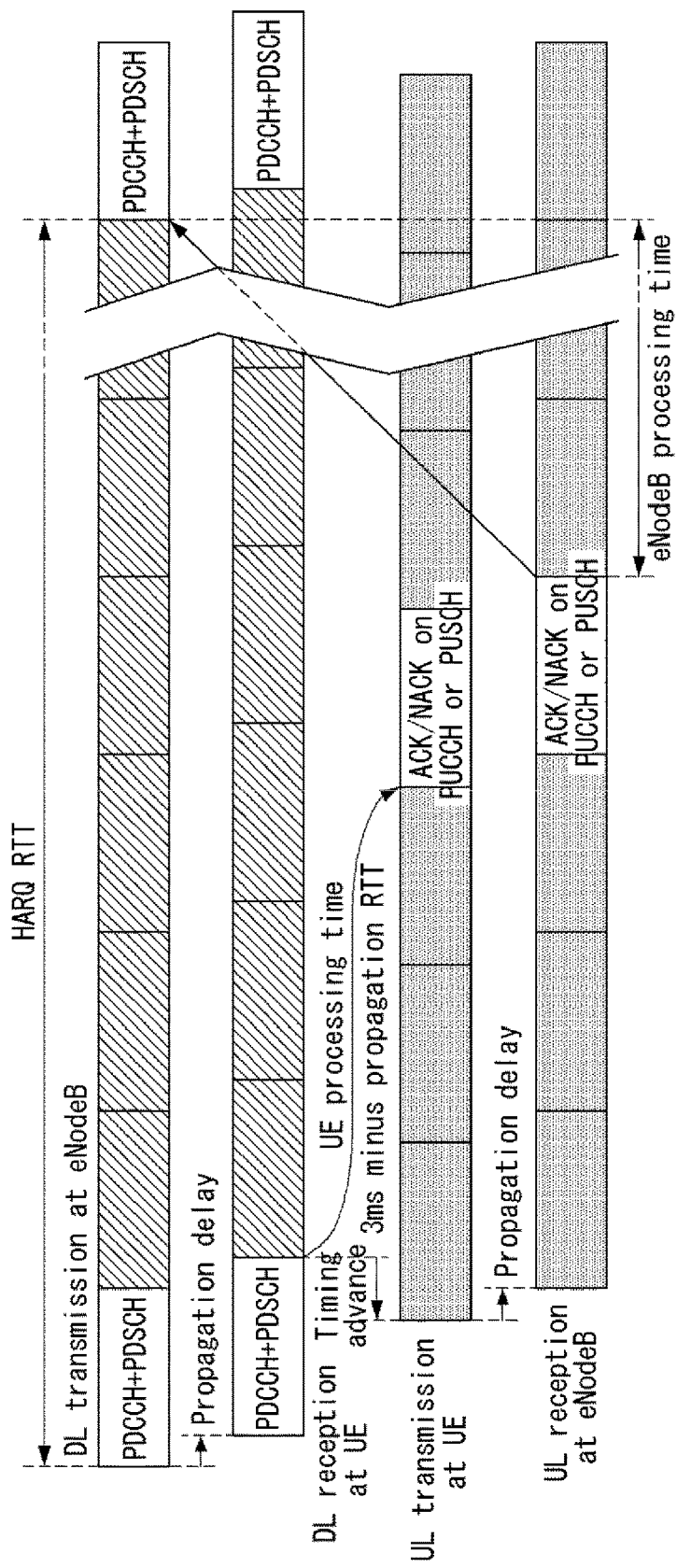
FIG. 8 is a diagram illustrating a downlink HARQ process in an LTE FDD system
Figure 9:
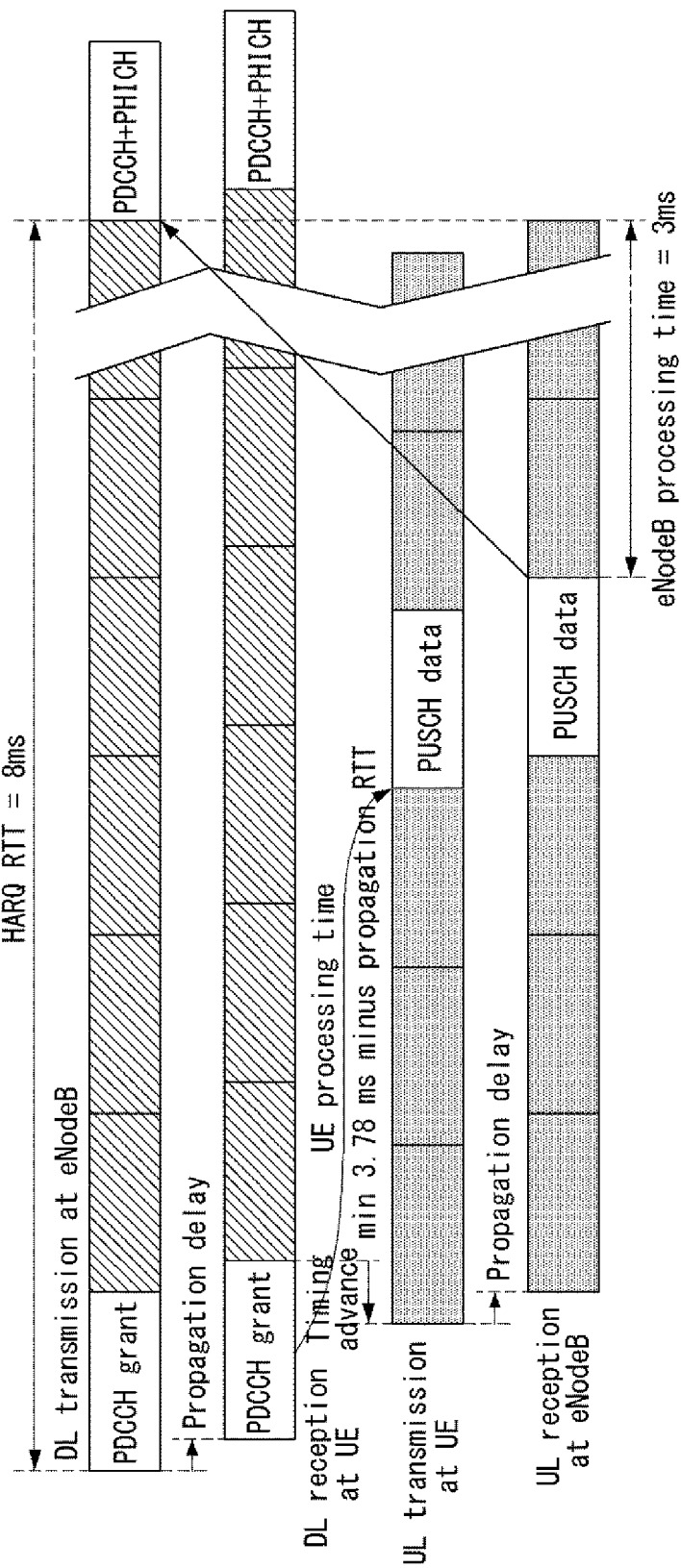
FIG. 9 is a diagram illustrating an uplink HARQ process in an LTE FDD system.

FIG. 8 is a diagram illustrating a downlink HARQ process in an LTE FDD system, and FIG. 9 is a diagram illustrating an uplink HARQ process in an LTE FDD system.

The respective HARQ processes are defined by a unique HARQ process identifier of 3 bit size, and individual soft buffer allocation for combination of retransmitted data is required for a reception end (that is, UE at the downlink HARQ process, and eNodeB at the uplink HARQ process).

In addition, it is defined that information such as a new data indicator (NDI), a redundancy version (RV) and a modulation and coding scheme (MCS) fields in the downlink control information for the HARQ processes. The NDI field is toggled whenever a new packet transmission is started. The RV field indicates the RV that is selected for a transmission and a retransmission. The MCS field indicates a modulation and coding method level.

The downlink HARQ process of the LTE system is an adaptive asynchronous scheme. Accordingly, the downlink control information for the HARQ process is explicitly accompanied per downlink transmission.

On the other hand, the uplink HARQ process of the LTE system is a synchronous scheme, and may be performed adaptively or non-adaptively. Since the uplink non-adaptive HARQ scheme does not accompany signaling of the explicit control information, the sequence such as previously set RV sequence (i.e., 0, 2, 3, 1, 0, 2, 3, 1, . . . ) is required for a continuous packet transmission. However, according to the uplink adaptive HARQ scheme, the RV is signaled explicitly. In order to minimize the control signaling, the uplink mode in which the RV (or the MCS) is combined with other control information is also supported.

Limited Buffer Rate Matching (LBRM)

Owing to the entire memory required for saving the Log-Likelihood Ratio (LLR) in order to support the HARQ process (throughout all HARQ processes), that is, the UE HARQ soft buffer size, the complexity in the UE implement is increased.

The object of the Limited Buffer Rate Matching (LBRM) is to maintain the peak data rates and to minimize the influence on the system performance, and in addition, to decrease the UE HARQ soft buffer size. The LBRM reduces the length of virtual circular buffer of the code block segments for the transmission block (TB) that has a size greater than a predetermined size. Using the LBRM, the mother code rate for the TB becomes the function of UE soft buffer size that is allocated to the TB size and the TB. For example, for the UE category that does not support the FDD operation and the UE of the lowest category (e.g., UE categories 1 and 2 that do not support the spatial multiplexing), the limit on the buffer is transparent. That is, the LBRM does not cause the reduction of the soft buffer. In the case of the UE of high category (i.e., UE categories 3, 4 and 5), the size of soft buffer is calculated by assuming the buffer decrease of 50% that corresponds to two thirds of the mother code rate for eight HARQ processes and the maximum TB. Since an eNB knows the soft buffer capacity of a UE, the code bit is transmitted in the virtual circular buffer (VCB) that may be stored in the HARQ soft buffer of the UE for all of the given TB (re)transmissions.

Synchronization Signal (SS)

A UE performs the initial cell search procedure including acquisition of time and frequency synchronization with the cell and detection of a physical cell ID of the cell. To this end, the UE may receive, from the eNB, synchronization signals, for example, a primary synchronization signal (PSS) and a secondary synchronization signal (SSS), establish synchronization with the eNB, and acquire information such as a cell ID.

Figure 10:
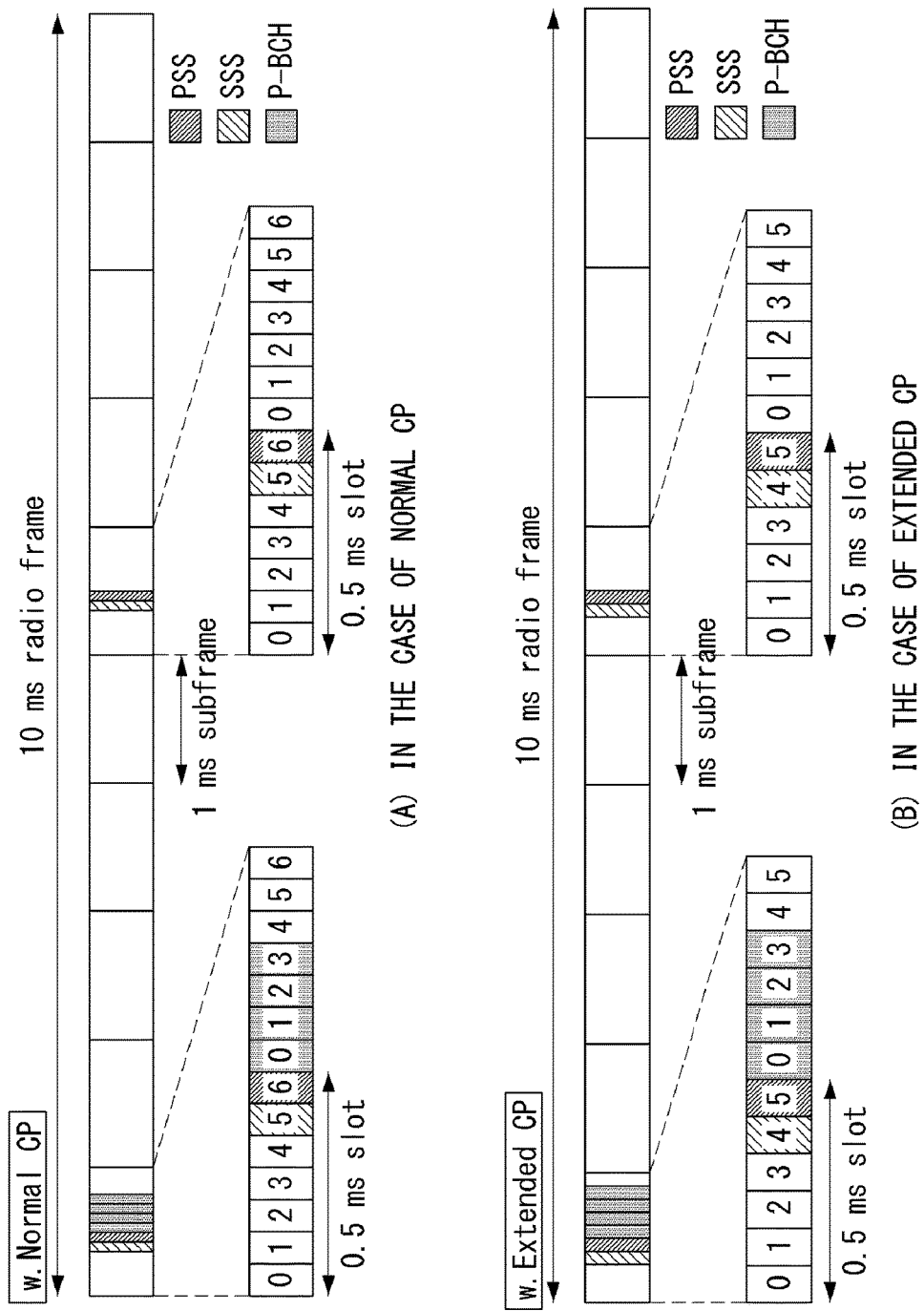
FIG. 10 illustrates a radio frame structure for transmitting the Synchronization Signal (SS) in a wireless communication system to which the present invention may be applied.

FIG. 10 illustrates a radio frame structure for transmitting the Synchronization Signal (SS) in a wireless communication system to which the present invention may be applied.

Particularly, FIG. 10 illustrates the radio frame structure for transmitting the SS and the PBCH in the frequency division duplex (FDD). FIG. 10(a) illustrates a transmission position of the SS and the PBCH in the radio frame configured with a normal cyclic prefix (CP), and FIG. 10(b) illustrates a transmission position of the SS and the PBCH in the radio frame configured with an extended CP.

SSs are divided into a PSS and an SSS. The PSS is used to obtain the time domain synchronization and/or the frequency domain synchronization such as the OFDM symbol synchronization, the slot synchronization, and so on, and the SSS is used to obtain the frame synchronization, a cell group ID and/or a CP configuration (i.e., usage information on the normal CP or the extended CP) of a cell.

Referring to FIG. 10, the PSS and the SSS in the time domain are transmitted on two OFDM symbols in every radio frame, respectively. Specifically, the SSs are transmitted on the first slot of subframe 0 and the first slot of subframe 5, respectively, in consideration of a Global System for Mobile communication (GSM) frame length, 4.6 ms, for facilitation of inter radio access technology (RAT) measurement. In particular, the PSS is transmitted on the last OFDM symbol of the first slot of subframe 0 and the last OFDM symbol of the first slot of subframe 5, and the SSS is transmitted on the second last OFDM symbol of the first slot of subframe 0 and the second last OFDM symbol of the first slot of subframe 5.

The boundary of a corresponding radio frame may be detected through the SSS. The PSS is transmitted on the last OFDM symbol of a corresponding slot, the SSS is transmitted on the immediately before the OFDM symbol of the PSS. The transmission diversity scheme of the SS uses only a single antenna port, and is not separately defined in the standard. That is, a single antenna port transmission scheme or a transmission scheme transparent to the UE (e.g., the precoding vector switching (PVS), the time switched diversity (TSTD), and the cyclic delay diversity (CDD)) may be used for the transmission diversity of the SS.

The PSS is transmitted on every 5 ms, and accordingly, the UE may recognize that the corresponding subframe is one of subframe 0 and subframe 5 by detecting the PSS, but may not specifically identify the subframe as subframe 0 or subframe 5. Accordingly, the UE is not capable of recognizing a boundary of radio frames with the PSS alone. That is, the frame synchronization cannot be acquired with the PSS alone. The UE detects the boundary of radio frames by detecting the SSS transmitted twice with different sequences in one radio frame.

In the frequency domain, the PSS and the SSS are mapped to six RBs positioned on the center of the downlink system bandwidth. In a downlink, the entire RBs includes different number of RBs (e.g., 6 RBs to 110 RBs) depending on the system bandwidth, but a UE may detect the PSS and the SSS in the same way since the PSS and the SSS are mapped to 6 RBs positioned on the center of the downlink system bandwidth.

Both of the PSS and the SSS include the sequence that has the length of 62. Accordingly, the PSS and the SSS are mapped to 62 subcarriers on the center, which are located at opposite sides of the DC subcarrier among 6 RBs, and the DC subcarrier and each of 5 subcarriers located at opposite side ends are not used.

A UE may obtain the physical layer cell ID from a specific sequence of the PSS and the SSS. That is, the combination of 3 PSSs and 168 SSSs, the SS may represent total 504 specific physical layer cell IDs.

In other words, the physical layer cell IDs are grouped into 168 physical-layer cell-ID groups that include three specific IDs in each group such that each of the physical layer cell IDs becomes a part of only one physical-layer cell-ID group. Accordingly, the physical layer cell ID Ncell ID (=3N(1)ID+N(2)ID) is specifically defined by the number N(1) ID within the range of 0 to 167 that represents the physical-layer cell-ID group and the number N(2) ID within the range of 0 to 2 that represents the physical-layer ID in the physical-layer cell-ID group.

A UE may know one of three specific physical-layer IDs by detecting the PSS and may recognize one of 168 physical layer cell IDs related to the physical-layer ID by detecting the SSS.

The PSS is generated based on the Zadoff-Chu (ZC) sequence that includes the length of 63 which is defined in the frequency domain.

$$d_u(n) = e^{-j\frac{\pi u n(n+1)}{N_{ZC}}} \qquad \text{[Equation 12]}$$

The ZC sequence is defined by Equation 12. And the sequence element n=31, corresponding to the DC subcarrier, is punctured. In Equation 12, $N_{zc}$=63.

The remaining 9 subcarriers among 6 RBs (=72 subcarriers) in the center portion of the system bandwidth are always transmitted with zero value, which leads to the ease in designing the filter for performing synchronization.

In order to define total three PSSs, the values u=25, 29 and 34 are used in Equation 12. In this case, since 29 and 34 are in conjugated symmetry relation, two correlations may be simultaneously performed. Herein, the conjugate symmetry means the relation shown in Equation 13 below. Using the characteristics, the implementation of one-shot correlator for u=29 and 34 is available, which may decrease about 33.3% in overall amount of operations.

$$d_u(n)=(-1)^n(d_{N_{ZC}-u}(n))^*, \text{ when } N_{ZC} \text{ is even number.}$$

$$d_u(n)=(d_{N_{ZC}-u}(n))^*, \text{ when } N_{ZC} \text{ is odd number.} \qquad \text{[Equation 13]}$$

The SSS is generated based on the M-sequence. Each SSS sequence is generated by concatenating SSC 1 sequence and SSC 2 sequence, which is two interleaved sequences, of which length is 31 in the frequency domain. By combining two sequences, 168 cell group IDs are transmitted. The m-sequence as the SSS sequence is robust in the frequency selective environment, and may be transformed to the high-speed m-sequence using the Fast Hadamard Transform, thereby the amount of operations being decreased. In addition, the configuration of SSS using two short codes is proposed to decrease the amount of operations of UE.

Figure 11:
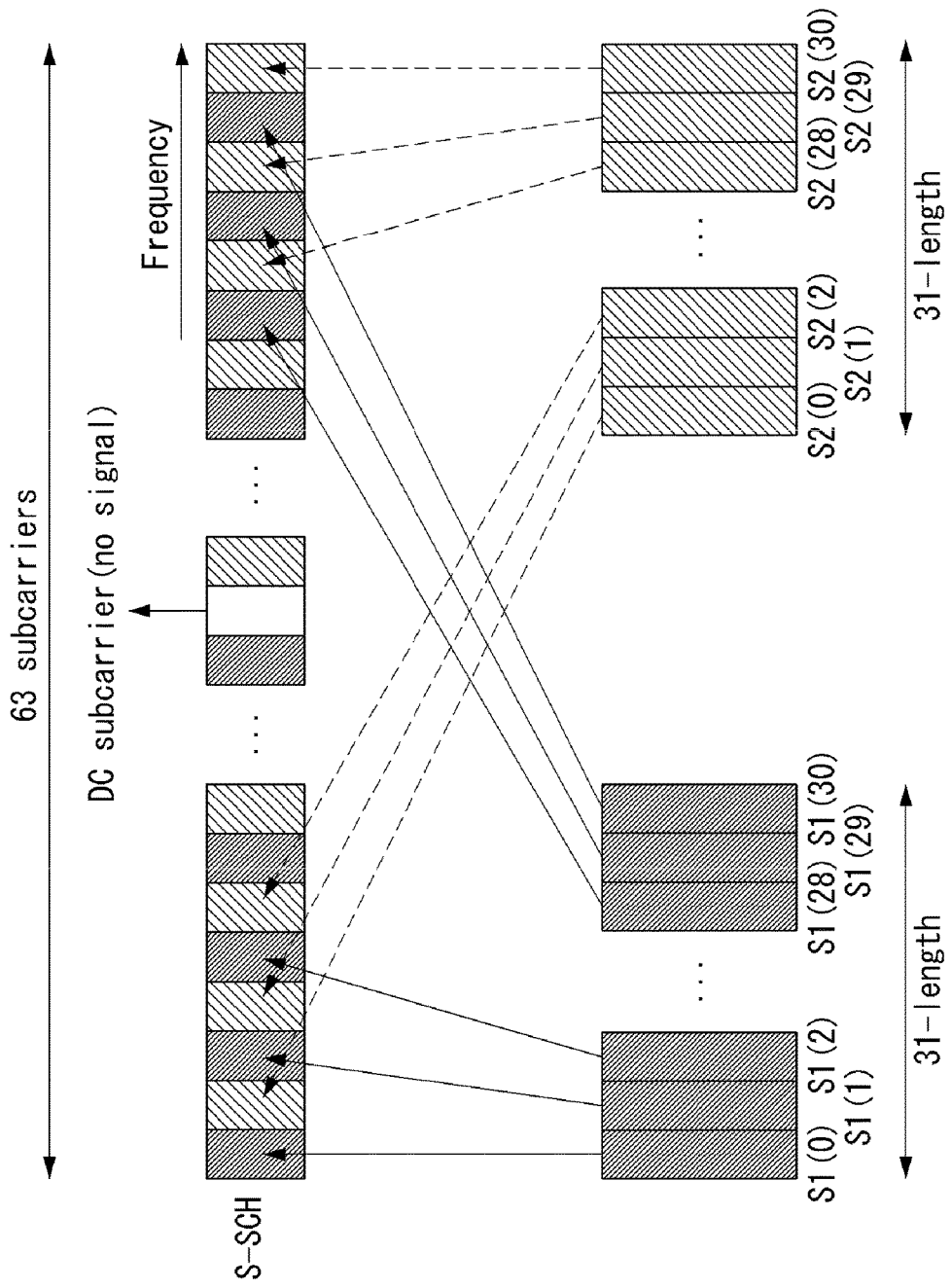
FIG. 11 illustrates a structure that two sequences for generating the secondary synchronization signal are mapped in the physical region with being interleaved.

FIG. 11 illustrates a structure that two sequences for generating the secondary synchronization signal are mapped in the physical region with being interleaved.

When two m-sequences used for generating the SSS sign are defined by SSS 1 and SSS 2, in the case that the SSS (SSS 1, SSS 2) of subframe 0 transmits the cell group ID with the combination, the SSS (SSS 2, SSS 1) of subframe 5 is transmitted with being swapped, thereby distinguishing the 10 ms frame boundary. In this case, the SSS sign uses the generation polynomial $x^5+x^2+1$, and total 31 signs may be generated through the circular shift.

In order to improve the reception performance, two different PSS-based sequences are defined and scrambled to the SSS, and scrambled to SSS 1 and SSS 2 with different sequences. Later, by defining the SSS 1-based scrambling sign, the scrambling is performed to SSS 2. In this case, the sign of SSS is exchanged in a unit of 5 ms, but the PSS-based scrambling sign is not exchanged. The PSS-based scrambling sign is defined by six circular shift versions according to the PSS index in the m-sequence generated from the generation polynomial $x^5+x^2+1$, and the SSS 1-based scrambling sign is defined by eight circular shift versions according to the SSS 1 index in the m-sequence generated from the generation polynomial $x^5+x^4+x^2+x^1+1$.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

Figure 12:
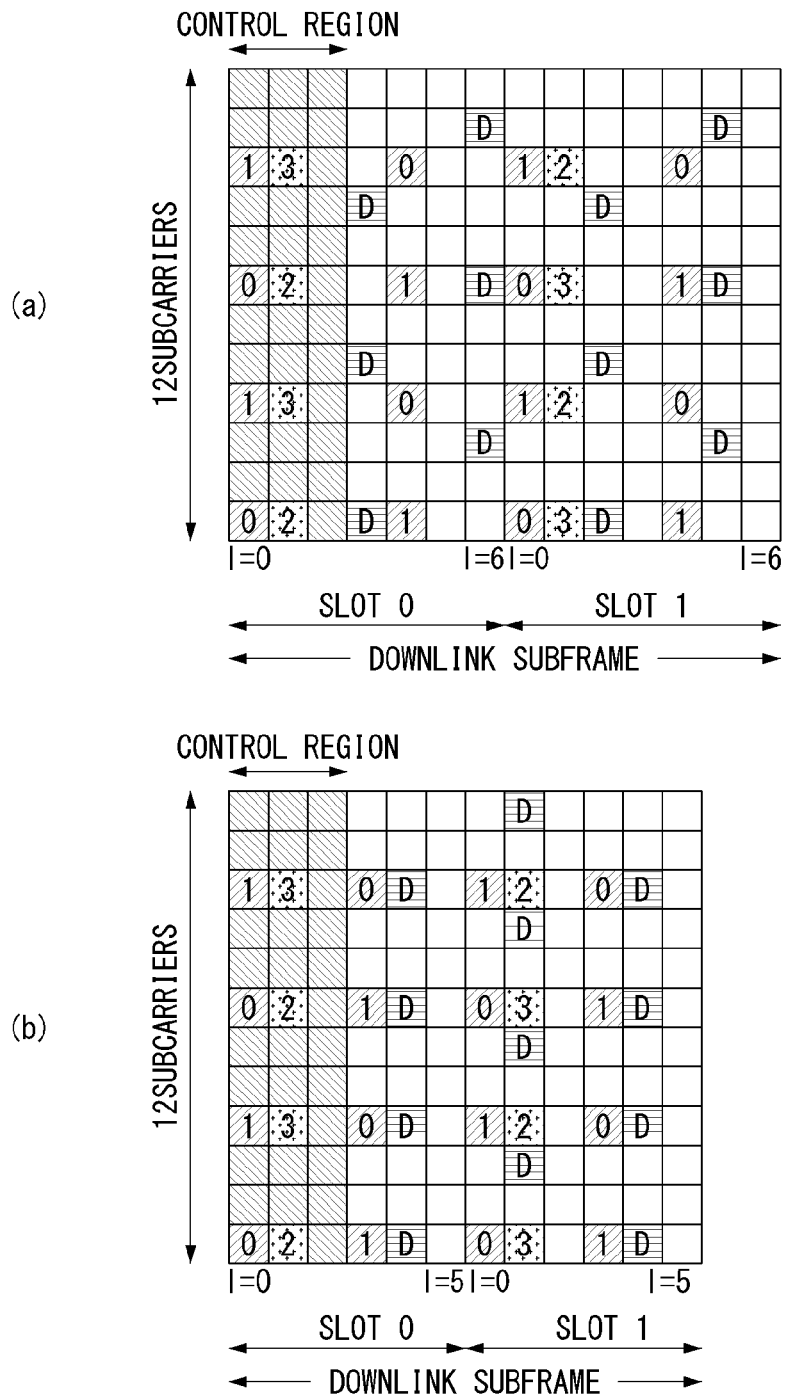
FIG. 12 illustrates a reference signal pattern mapped to a downlink resource block pair in the wireless communication system to which the present invention can be applied.

FIG. 12 illustrates a reference signal pattern mapped to a downlink resource block pair in the wireless communication system to which the present invention can be applied.

Referring to FIG. 12, as a unit in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 12a) and a length of 12 OFDM symbols in the case of an extended cyclic prefix (CP) (FIG. 12b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad [\text{Equation 14}]$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 14, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. $n_s$ represents a slot index and, $N_{ID}^{cell}$ represents a cell ID. mod represents an modulo operation. The position of the reference signal varies depending on the $v_{shift}$ value in the frequency domain. Since $v_{shift}$ depends on the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 15 shows the case of the normal CP and Equation 14 shows the case of the extended CP.

$$k = (k') \bmod N_{sc}^{RB} + N_{sc}^{RB} \cdot n_{PRB} \quad [\text{Equation 15}]$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad [\text{Equation 16}]$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 15 and 16, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. $n_s$ represents the slot index and $N_{ID}^{cell}$ represents the cell ID. mod represents the modulo operation. The position of the reference signal varies depending on the $v_{shift}$ value in the frequency domain. Since $v_{shift}$ depends on the cell ID, the position of the reference signal has various frequency shift values according to the cell.

The LTE-A system which is an evolved version of the LTE system should support maximum eight transmitting antennas for downlink transmission. Accordingly, reference signals for maximum eight transmitting antennas should also be supported. In the LTE system, since the downlink reference signals are defined for maximum four antenna ports, if the base station includes four or more downlink transmitting antennas and maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band of each subframe. However, in the LTE-A system, if reference signal patterns for maximum eight transmitting antennas are added to full band per subframe in the same manner as the CRS of the existing LTE system, the RS overhead becomes too great.

Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, a UE should have knowledge of the information for each of the CSI-RS antenna ports in the cell to which the UE belong such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When an eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When an eNB notifies the information of the CSI-RS to the UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

Figure 13:
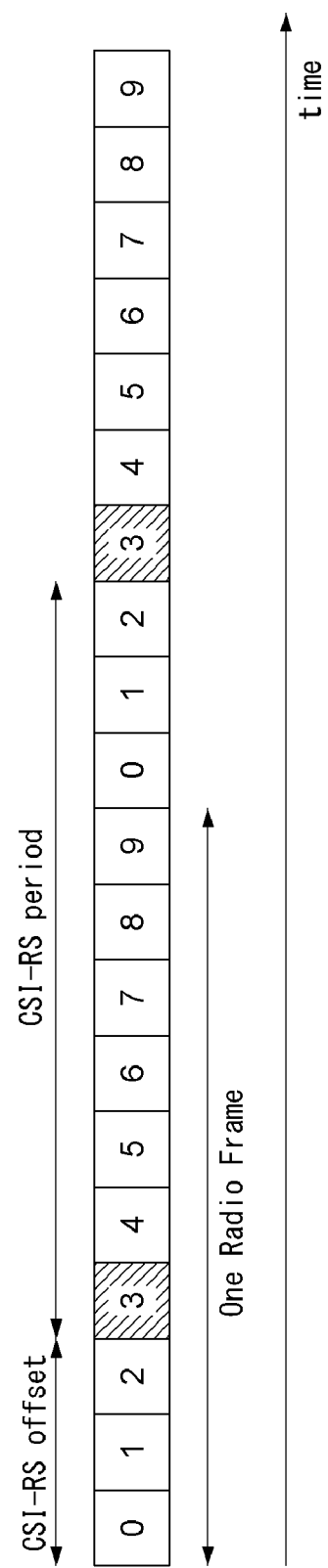
FIG. 13 illustrates a periodic transmission scheme of CSI-RS in a wireless communication system to which the present invention may be applied.

FIG. 13 illustrates a periodic transmission scheme of CSI-RS in a wireless communication system to which the present invention may be applied.

As shown in FIG. 13, for an eNB that transmits the CSI-RS, the transmission period of the corresponding eNB is 10 (ms or subframes), and the transmission offset of the CSI-RS is 3 (subframes). The eNB has different offset values such that the CSI-RS of several cells should be evenly distributed on the time. The eNB in which the CSI-RS is transmitted in the period of 10 ms has ten offset values of 0 to 9. The offset values represent the value of subframes on which the eNB that has a specific period actually starts the CSI-RS transmission. When the eNB notifies the period and the offset value of the CSI-RS to a UE, the UE measures the CSI-RS of the eNB on the corresponding position using the value and reports the information such as CQI/PMI/RI, etc. to the eNB. The all types of the information related to the CSI-RS are cell-specific information.

Figure 14:
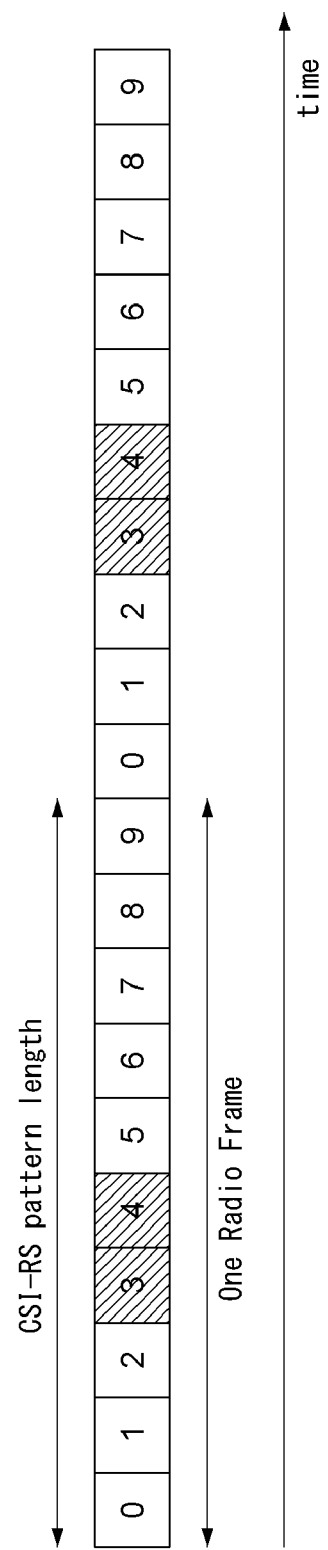
FIG. 14 illustrates an aperiodic transmission scheme of CSI-RS in a wireless communication system to which the present invention may be applied.

FIG. 14 illustrates an aperiodic transmission scheme of CSI-RS in a wireless communication system to which the present invention may be applied.

FIG. 14 exemplifies the scheme that the CSI-RS is transmitted with a transmission subframe pattern. The CSI-RS transmission pattern includes 10 subframes, and whether to transmit the CSI-RS is designated by 1 bit indicator in each subframe.

Generally, following two schemes are considered as the scheme that an eNB notifies the CSI-RS configuration to a UE.

First, a first scheme of using the Dynamic BCH (DBCH) signaling may be considered.

The first scheme is the scheme that an eNB broadcasts the information of the CSI-RS configuration to UEs. In the LTE system, when an eNB notifies the contents for the system information to UEs, the corresponding information is transmitted to the Broadcasting Channel (BCH), normally. However, in the case that there are too much contents and it is unable to transmit all of the contents to the BCH, the contents are transmitted in the same way of transmitting normal data, but the PDCCH of the corresponding data is transmitted by masking CRC using the System information RNTI (SI-RNTI), not a specific UE ID (e.g., C-RNTI). And, the actual system information is transmitted to the PDSCH region like the normal unicast data. Then, all of the UE in a cell decodes the PDCCH using the SI-RNTI, and acquires the system information by decoding the PDSCH indicated by the PDCCH. Such a broadcast scheme is also called the Dynamic BCH (DBCH), distinguished from the Physical BCH (PBCH) scheme that is normal broadcast scheme.

The system information broadcasted in the LTE system is divided into two types, largely: The Master Information Block (MIB) transmitted to the PBCH and the System Information Block (SIB) transmitted to the PDSCH with being multiplexed with the normal unicast data. In the LTE system, since the information transmitted in SIB type 1 to SIB type 8 (SIB 1~SIB 8) is already defined, the CSI-RS configuration is transmitted in SIB 9, SIB 10, and so on, that are newly introduced in the LTE-A system.

Next, a second scheme using the RRC signaling may be considered.

The second scheme is the scheme that an eNB notifies the CSI-RS configuration to each of UEs using the dedicated RRC signaling. During the process that a UE establishes a connection to the eNB through an initial access or the handover, the eNB notifies the CSI-RS configuration to the corresponding UE through the RRC signaling. Otherwise, the eNB notifies the CSI-RS configuration through an RRC signaling message that requires a channel state feedback based on the CSI-RS measurement to the UE.

The CSI-RS-Config information element (IE) is used for specifying the CSI-RS configuration.

Table 2 exemplifies the CSI-RS-Config IE.

Referring to Table 2, the 'antennaPortsCount' field indicates the number of antenna ports used for transmitting the CSI-RS. The 'resourceConfig' field indicates the CSI-RS configuration. The 'SubframeConfig' field and the 'zeroTx-PowerSubframeConfig' field indicate the subframe configuration ($I_{CSI-RS}$) on which the CSI-RS is transmitted.

The 'zeroTxPowerResourceConfigList' field indicates the zero-power (ZP) CSI-RS configuration. In the bitmap of 16 bit that configures the 'zeroTxPowerResourceConfigList' field, the CSI-RS configuration that corresponds to the bit configured as '1' may be configured as the ZP CSI-RS.

The 'p-c' field represents the parameter ($P_c$) assumed by a ratio of the PDSCH Energy Per Resource Element (EPRE) and the CSI-RS EPRE.

The CSI-RS is transmitted through 1, 2, 4 or 8 antenna ports. In this case, the antenna port which is used is p=15, p=15, 16, p=15, ..., 18 or p=15, ..., 22. The CSI-RS may be defined only for the subcarrier interval Δf=15 kHz.

The CSI-RS sequence may be generated by Equation 17 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 17]}$$

$$m = 0, 1, \ldots, N_{RB}^{max,DL} - 1$$

Herein, $r_{l,n_s}(m)$ represents the generated CSI-RS sequence, c(i) represents the pseudo-random, $n_s$ is a slot number in a radio frame, l represents an OFDM symbol number in a slot, and $N_{RB}^{maxDL}$ represents the maximum RB number in a downlink bandwidth.

The pseudo-random sequence generator is initialized in every OFDM start as represented by Equation 18 below.

$$c_{init} = 2^{10} \cdot (7 \cdot (n_s+1)+l+1) \cdot (2 \cdot N_{ID}^{cell}+1) + 2 \cdot N_{ID}^{cell} + N_{CP} \quad \text{[Equation 18]}$$

In Equation 18, $N_{ID}^{cell}$ represents the cell ID, $N_{CP}=1$ in the case of the normal CP and $N_{CP}=0$ in the case of the extended CP.

In the subframe configured to transmit the CSI-RS, the CSI-RS sequence $r_{l,n_s}(m)$ generated through Equation 17 is mapped to the complex-valued modulation symbol $a_{k,l}^{(p)}$ that is used as a reference symbol on each antenna port (p) as represented by Equation 19 below.

TABLE 2

```
-- ASN1START
CSI-RS-Config-r10 ::=         SEQUENCE {
    csi-RS-r10                    CHOICE {
        release                       NULL,
        setup                         SEQUENCE {
            antennaPortsCount-r10         ENUMERATED (an1, an2, an4, an8),
            resourceConfig-r10            INTEGER (0..31),
            subframeConfig-r10            INTEGER (0..154),
            p-C-r10                       INTEGER (-8..15)
        }
    }                                                                OPTIONAL,
    -- Need ON
    zeroTxPowerCSI-RS-r10         CHOICE {
        release                       NULL,
        setup                         SEQUENCE {
            zeroTxPowerResourceConfigList-r10   BIT STRING (SIZE (16)),
            zeroTxPowerSubframeConfig-r10       INTEGER (0..154)
        }
    }                                                                OPTIONAL
    -- Need ON
}
-- ASN1STOP
```

$$a_{k,l}^{(p)} = w_{l''} \cdot r_{l,n_s}(m')$$ [Equation 19]

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ normal cyclic prefix} \\
-3 & \text{for } p \in \{17, 18\}, \text{ normal cyclic prefix} \\
-6 & \text{for } p \in \{19, 20\}, \text{ normal cyclic prefix} \\
-9 & \text{for } p \in \{21, 22\}, \text{ normal cyclic prefix}
\end{cases}$$

$$l = l' +
\begin{cases}
l'' & \text{CSI reference signal configurations 0-19,} \\
& \text{normal cyclic prefix} \\
2l'' & \text{CSI reference signal configurations 20-31,} \\
& \text{normal cyclic prefix} \\
l'' & \text{CSI reference signal configurations 0-27,} \\
& \text{extended cyclic prefix}
\end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 19 above, (k',l') (herein, k' is a subcarrier index in a resource block, and l' represents an OFDM symbol index in a slot) and the condition of $n_s$ is determined according to the CSI-RS configuration shown in Table 3 or Table 4 below.

Table 3 exemplifies the mapping of (k',l') according to the CSI-RS configuration for the normal CP.

TABLE 3

| CSI reference signal configuration | | Number of CSI reference signals configured | | | | |
|---|---|---|---|---|---|---|
| | | 1 or 2 | | 4 | | 8 |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |

TABLE 3-continued

| CSI reference signal configuration | | Number of CSI reference signals configured | | | | |
|---|---|---|---|---|---|---|
| | | 1 or 2 | | 4 | | 8 |
| | | (k', l') | $n_s$ mod 2 | (k', l') | $n_s$ mod 2 | (k', l') | $n_s$ mod 2 |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 exemplifies the mapping of (k',l') according to the CSI-RS configuration for the extended CP.

TABLE 4

| CSI reference signal configuration | | Number of CSI reference signals configured | | | | |
|---|---|---|---|---|---|---|
| | | 1 or 2 | | 4 | | 8 |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

The CSI-RS configuration is different depending on the number of antenna ports in a cell and the CP, neighbor cells may have different configurations to the maximum. In addition, the CSI-RS configuration may be divided into the case of being applied to both the FDD frame and the TDD frame and the case of being applied to only the TDD frame.

Based on Table 3 and Table 4, (k',l') and $n_s$ are determined according to the CSI-RS configuration. By applying these values to Equation 19, the time-frequency resource that each CSI-RS antenna port uses for transmitting the CSI-RS is determined.

Figure 15:
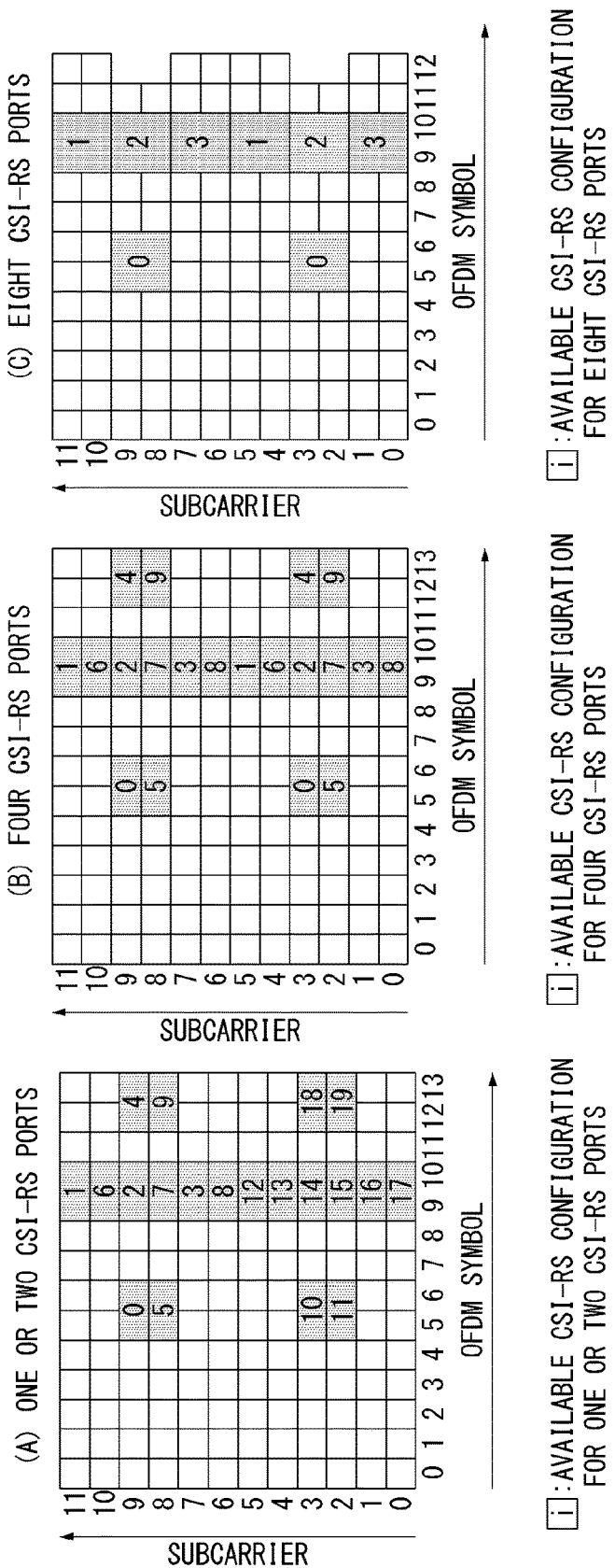
FIG. 15 is a diagram illustrating the CSI-RS configuration in a wireless communication system to which the present invention may be applied.

FIG. 15 is a diagram illustrating the CSI-RS configuration in a wireless communication system to which the present invention may be applied.

Particularly, FIG. 15 exemplifies the CSI-RS configuration (i.e., the case of normal CP) according to Equation 19 and Table 3.

FIG. 15(a) shows twenty CSI-RS configurations that are usable in the CSI-RS transmission through one or two CSI-RS antenna ports, and FIG. 15(b) shows ten CSI-RS configurations that are usable by four CSI-RS antenna ports. FIG. 15(c) shows five CSI-RS configurations that are usable in the CSI-RS transmission through eight CSI-RS antenna ports.

As such, according to each CSI-RS configuration, the radio resource (i.e., RE pair) in which the CSI-RS is transmitted is determined.

When one or two CSI-RS antenna ports are configured for transmitting the CSI-RS for a specific cell, the CSI-RS is transmitted on the radio resource according to the configured CSI-RS configuration among twenty CSI-RS configurations shown in FIG. 15(a).

Similarly, when four CSI-RS antenna ports are configured for transmitting the CSI-RS for a specific cell, the CSI-RS is transmitted on the radio resource according to the configured CSI-RS configuration among ten CSI-RS configurations shown in FIG. 15(b). In addition, when eight CSI-RS antenna ports are configured for transmitting the CSI-RS for a specific cell, the CSI-RS is transmitted on the radio resource according to the configured CSI-RS configuration among five CSI-RS configurations shown in FIG. 15(c).

The CSI-RS for each of the antenna ports is transmitted with being CDM to the same radio resource for each of two antenna ports (i.e., {15,16}, {17,18}, {19,20}, {21,22}). As an example of antenna ports 15 and 16, although the respective CSI-RS complex symbols are the same for antenna ports 15 and 16, the CSI-RS complex symbols are mapped to the same radio resource with being multiplied by different orthogonal codes (e.g., Walsh code). To the complex symbol of the CSI-RS for antenna port 15, [1, 1] is multiplied, and [1, −1] is multiplied to the complex symbol of the CSI-RS for antenna port 16, and the complex symbols are mapped to the same radio resource. This procedure is the same for antenna ports {17,18}, {19,20} and {21,22}.

A UE may detect the CSI-RS for a specific antenna port by multiplying a code multiplied by the transmitted code. That is, in order to detect the CSI-RS for antenna port 15, the multiplied code [1 1] is multiplied, and in order to detect the CSI-RS for antenna port 16, the multiplied code [1−1] is multiplied.

Referring to FIGS. 15(a) to (c), when a radio resource is corresponding to the same CSI-RS configuration index, the radio resource according to the CSI-RS configuration including a large number of antenna ports includes the radio resource according to the CSI-RS configuration including a small number of antenna ports. For example, in the case of CSI-RS configuration 0, the radio resource for eight antenna ports includes all of the radio resource for four antenna ports and one or two antenna ports.

A plurality of CSI-RS configurations may be used in a cell. Zero or one CSI-RS configuration may be used for the non-zero power (NZP) CSI-RS, and zero or several CSI-RS configurations may be used for the zero power CSI-RS.

A UE presumes the zero power transmission for the REs (except the case of being overlapped with the RE that presumes the NZP CSI-RS that is configured by a high layer) that corresponds to four CSI-RS column in Table 3 and Table 4 above, for every bit that is configured as '1' in the Zero Power CSI-RS (ZP-CSI-RS) which is the bitmap of 16 bits configured by a high layer. The Most Significant Bit (MSB) corresponds to the lowest CSI-RS configuration index, and the next bit in the bitmap corresponds to the next CSI-RS configuration index in order.

The CSI-RS is transmitted in the downlink slot only that satisfies the condition of $n_s$ mod 2 in Table 3 and Table 4 above and the CSI-RS subframe configuration.

In the case of frame structure type 2 (TDD), in the subframe that collides with a special subframe, SS, PBCH or SIB 1 (SystemInformationBlockType1) message transmission or the subframe that is configured to transmit a paging message, the CSI-RS is not transmitted.

In addition, the RE in which the CSI-RS for a certain antenna port that is belonged to an antenna port set S (S={15}, S={15,16}, S={17,18}, S={19,20} or S={21,22}) is transmitted is not used for transmitting the PDSCH or the CSI-RS of another antenna port.

Since the time-frequency resources used for transmitting the CSI-RS is unable to be used for transmitting data, the data throughput decreases as the CSI-RS overhead increases. Considering this, the CSI-RS is not configured to be transmitted in every subframe, but configured to be transmitted in a certain transmission period that corresponds to a plurality of subframes. In this case, the CSI-RS transmission overhead may be significantly decreased in comparison with the case that the CSI-RS is transmitted in every subframe.

The subframe period (hereinafter, referred to as 'CSI-RS transmission period'; $T_{CSI-RS}$) for transmitting the CSI-RS and the subframe offset ($\Delta_{CSI-RS}$) are represented in Table 5 below.

Table 5 exemplifies the configuration of CSI-RS subframe.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 5, according to the CSI-RS subframe configuration ($I_{CSI-RS}$), the CSI-RS transmission period ($T_{CSI-RS}$) and the subframe offset ($\Delta_{CSI-RS}$) are determined.

The CSI-RS subframe configuration in Table 5 is configured as one of the 'SubframeConfig' field and the 'zeroTxPowerSubframeConfig' field in Table 2 above. The CSI-RS subframe configuration may be separately configured for the NZP CSI-RS and the ZP CSI-RS.

The subframe including the CSI-RS satisfies Equation 20 below.

$$(10n_f + \lfloor n_s/2 \rfloor - \Delta_{CSI-RS}) \bmod T_{CSI-RS} = 0 \qquad \text{[Equation 20]}$$

In Equation 20, $T_{CSI-RS}$ represents the CSI-RS transmission period, $\Delta_{CSI-RS}$ represents the subframe offset value, $n_f$ represents the system frame number, and $n_s$ represents the slot number.

In the case of a UE to which transmission mode 9 is set for a serving cell, a single CSI-RS resource may be set to the UE. In the case of a UE to which transmission mode 10 is set for a serving cell, one or more CSI-RS resources may be set to the UE.

For each CSI-RS resource configuration, the following parameters may be set through high layer signaling.

In the case that transmission mode 10 is set, the CSI-RS resource configuration identifier The number of CSI-RS ports The CSI-RS configuration (refer to Table 3 and Table 4)

The CSI-RS subframe configuration ($I_{CSI-RS}$; refer to Table 5)

In the case that transmission mode 9 is set, the transmission power ($P_c$) for the CSI feedback In the case that transmission mode 10 is set, the transmission power ($P_c$) for the CSI feedback with respect to each CSI process. When the CSI subframe sets $C_{CSI,0}$ and $C_{CSI,1}$ are set by a high layer for the CSI process, $P_c$ is set for each CSI subframe set of the CSI process.

The pseudo-random sequence generator parameter ($n_{ID}$)

In the case that transmission mode 10 is set, the QCL scrambling identifier (qcl-ScramblingIdentity-r11) for assuming the Quasi Co-Located (QCL) type B UE, the CRS port count (crs-PortsCount-r11), and the high layer parameter ('qcl-CRS-Info-r11') that includes the MBSFN subframe configuration list (mbsfn-Subframe-ConfigList-r11) parameter When the CSI feedback value obtained by a UE has the value in the range of [−8, 15] dB, $P_c$ is presumed by the ratio of the PDSCH EPRE for the CSI-RS EPRE. Herein, the PDSCH EPRE corresponds to the symbol in which the ratio of PDSCH EPRE for the CRS EPRE is $\rho_A$.

In the same subframe of a serving cell, the CSI-RS and the PMCH are not configured together.

When four CRS antenna ports are configured in frame structure type 2, the CSI-RS configuration index belonged to [20-31] set in the case of the normal CP (refer to Table 3) or [16-27] set in the case of the extended CP (refer to Table 4) is not configured to a UE.

A UE may assume that the CSI-RS antenna port of the CSI-RS resource configuration has the QCL relation with the delay spread, the Doppler spread, the Doppler shift, the average gain and the average delay.

The UE to which transmission mode 10 and QCL type B are configured may assume that the antenna ports 0 to 3 corresponding to the CSI-RS resource configuration and the antenna ports 15 to 22 corresponding to the CSI-RS resource configuration have the QCL relation with the Doppler spread and the Doppler shift.

For the UE to which transmission mode 10 is configured, one or more Channel-State Information-Interference Measurement (CSI-IM) resource configuration may be set.

The following parameters may be configured for each CSI-IM resource configuration through high layer signaling.

The ZP CSI-RS configuration (refer to Table 3 and Table 4)

The ZP CSI-RS subframe configuration ($I_{CSI-RS}$; refer to Table 5)

The CSI-IM resource configuration is the same as one of the configured ZP CSI-RS resource configuration.

In the same subframe in a serving cell, the CSI-IM resource and the PMCH are not configured simultaneously.

For the UE to which transmission modes 1 to 9 are set, a ZP CSI-RS resource configuration may be set to the UE for the serving cell. For the UE to which transmission mode 10 is set, one or more ZP CSI-RS resource configurations may be set to the UE for the serving cell.

The following parameters may be configured for the ZP CSI-RS resource configuration through high layer signaling.

The ZP CSI-RS configuration list (refer to Table 3 and Table 4)

The ZP CSI-RS subframe configuration ($I_{CSI-RS}$; refer to Table 5)

In the same subframe in a serving cell, the ZP CSI-RS resource and the PMCH are not configured simultaneously.

Cell Measurement/Measurement Report

For one or several methods among the several methods (handover, random access, cell search, etc.) for guaranteeing the mobility of UE, the UE reports the result of a cell measurement to an eNB (or network).

In the 3GPP LTE/LTE-A system, the cell-specific reference signal (CRS) is transmitted through 0, 4, 7 and $11^{th}$ OFDM symbols in each subframe on the time axis, and used for the cell measurement basically. That is, a UE performs the cell measurement using the CRS that is received from a serving cell and a neighbor cell, respectively.

The cell measurement is the concept that includes the Radio resource management (RRM) measurement such as the Reference signal receive power (RSRP) that measures the signal strength of the serving cell and the neighbor cell or the signal strength in comparison with total reception power, and so on, the Received signal strength indicator (RSSI), the Reference signal received quality (RSRQ), and the like and the Radio Link Monitoring (RLM) measurement that may evaluate the radio link failure by measuring the link quality from the serving cell.

The RSRP is a linear average of the power distribution of the RE in which the CRS is transmitted in a measurement frequency band. In order to determine the RSRP, CRS (R0) that corresponds to antenna port '0' may be used. In addition, in order to determine the RSRP, CRS (R1) that corresponds to antenna port '1' may be additionally used. The number of REs used in the measurement frequency band and the measurement duration by a UE in order to determine the RSRP may be determined by the UE within the limit that satisfies the corresponding measurement accuracy requirements. In addition, the power per RE may be determined by the energy received in the remaining part of the symbol except the CP.

The RSSI is obtained as the linear average of the total reception power that is detected from all sources including the serving cell and the non-serving cell of the co-channel, the interference from an adjacent channel, the thermal noise, and so on by the corresponding UE in the OFDM symbols including the RS that corresponds to antenna port '0'. When a specific subframe is indicated by high layer signaling for performing the RSRQ measurement, the RSSI is measured through all OFDM symbols in the indicated subframes.

The RSRQ is obtained by N×RSRP/RSSI. Herein, N means the number of RBs of the RSSI measurement bandwidth. In addition, the measurement of the numerator and the denominator in the above numerical expression may be obtained by the same RB set.

A BS may forward the configuration information for the measurement to a UE through high layer signaling (e.g., RRC Connection Reconfiguration message).

The RRC Connection Reconfiguration message includes a radio resource configuration dedicated ('radioResourceConfigDedicated') Information Element (IE) and the measurement configuration ('measConfig') IE.

The 'measConfig' IE specifies the measurement that should be performed by the UE, and includes the configuration information for the intra-frequency mobility, the inter-frequency mobility, the inter-RAT mobility as well as the configuration of the measurement gap.

Particularly, the 'measConfig' IE includes 'measObjectToRemoveList' that represents the list of the measurement object ('measObject') that is to be removed from the measurement and 'measObjectToAddModList' that represents the list that is going to be newly added or amended. In addition, 'MeasObjectCDMA2000', 'MeasObjctEUTRA', 'MeasObjectGERAN' and so on are included in the 'meas Object' according to the communication technique.

The 'RadioResourceConfigDedicated' IE is used to setup/modify/release the Radio Bearer, to change the MAC main configuration, to change the Semi-Persistent Scheduling (SPS) configuration and to change the dedicated physical configuration.

The 'RadioResourceConfigDedicated' IE includes the 'measSubframePattern-Serv' field that indicates the time domain measurement resource restriction pattern for serving cell measurement. In addition, the 'RadioResourceConfigDedicated' IE includes 'measSubframeCellList' indicating the neighbor cell that is going to be measured by the UE and 'measSubframePattern-Neigh' indicating the time domain measurement resource restriction pattern for neighbor cell measurement.

The time domain measurement resource restriction pattern that is configured for the measuring cell (including the serving cell and the neighbor cell) may indicate at least one subframe per radio frame for performing the RSRQ measurement. The RSRQ measurement is performed only for the subframe indicated by the time domain measurement resource restriction pattern that is configured for the measuring cell.

As such, a UE (e.g., 3GPP Rel-10) should measure the RSRQ only in the duration configured by the subframe pattern ('measSubframePattern-Serv') for the serving cell measurement and the subframe pattern ('measSubframePattern-Neigh') for the neighbor cell measurement.

Although the measurement in the pattern for the RSRQ is not limited, but it is preferable to be measured only in the pattern for the accuracy requirement.

Measurement Method Based on Discovery Signal

The Research on the techniques regarding the small cell enhancement (SCE) for small cells to cover a relatively very small area using less power compared with the existing macro cells is intensively underway in order to cover the data traffic that is explosively increasing.

The small cell enhancement means a technique for enabling efficient mobility management while covering increasing traffic by densely arranging small cells in macro cell coverage (or without macro cell coverage in the case of the inside of a building) and dramatically increasing spectrum efficiency per unit area through close cooperation between a macro cell eNB and a small cell eNB or between small cell eNBs. In particular, in a certain region such as a so-called hot spot in the cell, there is a specially high communication demand, and in some regions such as cell edges or coverage holes, the reception of radio waves may be decreased, so that small cells may be utilized in the region with high demand for data services such as hot spots or communication shadow areas that is not covered by macro cells alone.

The macro cell eNB may be referred to as macro eNB (MeNB), and the small cell eNB may be referred to as small eNB, secondary eNB (SeNB).

The small cell enhancement supports the small cell on/off mechanism that maintains the on-state of the small cell only in the case that a UE is existed in the small cell coverage for the energy saving of the small cell and for decreasing the interference on a neighbor cell, otherwise, that maintains the off-state of the small cell.

Since the UE mobility management (e.g., handover, etc.) is performed based on the frequency (i.e., (component) carrier, cell) of the macro cell, the connection between the UE and the network is not completely disconnected even though a part of the small cell is in the off-state.

The discovery procedure is required for the small cell in the UE to determine the on/off state.

For this, regardless of the on/off-state, the small cell is defined to transmit (i.e., broadcast) the discovery signal (or discovery reference signal; DRS) always.

Hereinafter, in the present disclosure, the discovery signal or the discovery reference signal is briefly referred to as 'DRS'.

In other words, the DRS is broadcasted in a predetermined period even in the case that the small cell is in the off-state. The predetermined period may assumed to be a measurement period, and may be correspond to 40 ms, 80 ms, 160 ms, and the like, for example. In this case, the small cell may maintain the on-state for broadcasting the DRS for a predetermined time (e.g., one to five subframes). For example, in the case that the measurement period is 40 ms, the DRS is broadcasted during 6 ms while the on-state being maintained, and the off-state may be maintained for the rest 34 ms.

As such, the duration for transmitting the DRS may be called a measurement window or a discovery signal occasion. That is, the discovery signal occasion includes consecutive frame durations (e.g., one to five consecutive subframe durations), and one discovery signal occasion may be existed in every measurement period.

A UE performs a measurement based on the DRS that is received from a small cell, and transmits a measurement report to an eNB (or network). As such, the eNB may recognize the small cell of the most efficient around the corresponding UE by having the UE measure the DRS transmitted from the small cell and report the result to the eNB (or network) regardless of the small cell being in on/off-state. For example, as a result of the measurement result from the UE, the eNB (network) may switch the small cell that is in the off-state but has the great DRS reception power from the UE to the on-state.

In the dense small cell scenario, a UE may be connected to an overlaid macro cell, and a small cell may be used for data offloading. In such a case, it is preferable that the UE discovers a lot of cells in a communication range, and the overlaid macro layer selects an optimal cell by considering not only the loading information but also other information.

In other words, the optimal cell for data offloading may not be the cell that is selected based on the RSRP/RSRQ/RSSI. But rather, the cell that has low loading or many users may be more preferable in the aspect of overall cell management. Accordingly, an advanced discovery procedure may be considered for searching more cells than being performing the existing mechanism.

The following characteristics may be considered with respect to the advanced discovery signal.

Search more cells than the legacy PSS/SSS/CRS based on cell discovery

Search cells in a time shorter than a subframe

Perform a search in a time shorter than a subframe

Support a measurement required for the fast time scale on/off operations

The following several candidates may be considered as the discovery signal for the advanced discovery algorithm.

(1) PSS/(SSS)+CRS (2) PSS/(SSS)+CSI-RS (3) PSS/(SSS)+PRS (4) Or, the combination of one or more options among (1) to (3) above It is anticipated that a discovery signal may be used for the coarse time/frequency tracking, a measurement and a Quasi Co-Located (QCL) case (if it is required). Considering several purposes, the discovery signal should be designed to satisfy the following requirements.

(1) Under the assumption of very high initial timing error (e.g., ±2.5 ms), the discovery signal should support the coarse time synchronization.

(2) The discovery signal should support the adequate accuracy in a measurement.

In order to support requirements (1) and (2), it may be assumed that the PSS and/or the SSS may be transmitted.

For a simple configuration, the following limit condition may be considered for the period of the advanced discovery signal.

(1) A plurality of measurement gap periods: for example, 40 msec, 80 msec, 160 msec or 320 msec (a plurality of new measurement gap periods may be considered when a new measurement gap period is set.)

(2) DRS cycle and alignment: 10, 20, 32, 40, 64, 80, 128, 160, 256, 320, 512, 640, 1024, 1280, 2048 and 2560 (if a UE may perform a measurement using the legacy signal for a serving cell, this requirement may be excluded.)

(3) When the PSS/SSS is transmitted as a discovery signal, the period of the discovery signal may be a multiple of 5 msec such that the PSS/SSS that is transmitted for the advance discovery signal may be replaced by the PSS/SSS that is transmitted in the on-state. If the discovery signal is not transmitted in the on-state, this requirement may be excluded.

In addition, in order to prevent the influence on the legacy UE, different periods from the PSS/SSS may be considered. That is, the PSS/SSS may be transmitted during the on-state, and an additional PSS/SSS may be transmitted for the discovery signal transmission. In the case that the DRS-PSS and the DRS-SSS are additionally transmitted separately from the PSS/SSS that is transmitted in the on-state, the cell ID acquired from the DRS-PSS/DRS-SSS may be different from the cell ID acquired from the PSS/SSS.

The QCL relation will be described. As an example of the case between two antenna ports, in the case that the large-scale property of the radio channel in which a symbol is transmitted through an antenna port may be inferred from the radio channel in which a symbol is transmitted through another antenna port, it may be called that the two antenna ports are in the QCL relation (or be QCL). Here, the large-scale property includes one or more of the delay spread, the Doppler spread, the Doppler shift, the average gain and the average delay.

That is, the fact that two antenna ports are in the QCL relation means that the large-scale property of the radio channel from an antenna port is the same as the large-scale property of the radio channel from another antenna port. Considering a plurality of antenna ports in which the RS is transmitted, when the antenna ports in which different two types of RSs are transmitted are in the QCL relation, the large-scale property of the radio channel from a type of antenna port may be replaced by the large-scale property of the radio channel from another type of antenna port.

According to the concept of QCL, a UE may not assume the same large-scale property between the radio channels from the corresponding antenna ports for non-QCL antenna ports. That is, in this case, the UE should perform the independent processing for each non-QCL antenna port that is configured for the timing acquisition and tracking, the frequency offset and compensation, the delay estimation and the Doppler estimation, and so on.

Between the antenna ports in which the QCL relation is assumed, there is an advantage that a UE may perform the following operations.

With respect to the delay spread and the Doppler spread, a UE may apply the estimated result of the power-delay-profile, the delay spread and the Doppler spectrum, the Doppler spread for the radio channel from an antenna port to the Wiener filter and the like that are used in the channel estimation for the radio channel from another antenna port.

With respect to the frequency shift and the received timing, a UE may perform the time and frequency synchronization for an antenna port, and may apply the same synchronization to the demodulation of another antenna port.

With respect to the average reception power, a UE may take an average of the Reference Signal Received Power (RSRP) for two or more antenna ports.

Figure 16:
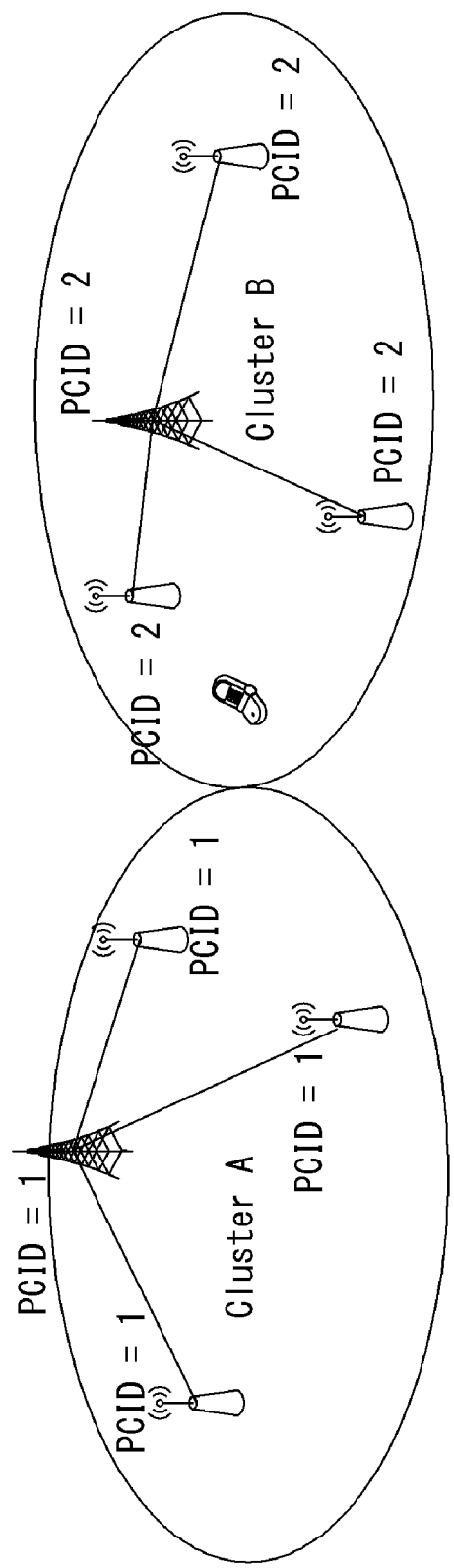
FIG. 16 is a diagram illustrating a small cell cluster/group to which the present invention may be applied.

FIG. 16 is a diagram illustrating a small cell cluster/group to which the present invention may be applied.

As shown in FIG. 16, the "shared cell-ID scenario" means the scenario that a plurality of transmission points (TPs) in a specific (small cell) cluster/group uses the same Physical cell-ID (PCID). Even in the case that the TPs in a cluster/group use the same PCID, each of the clusters (Cluster A and Cluster B) uses different PCIDs, respectively.

In this case, the PCID may mean a Cell-specific ID that is used for transmitting the PSS/SSS and CRS like the current LTE system, or may be separate cluster/group ID that is commonly used in a specific cluster/group.

When the TPs belonged to the same cluster/group share the same PCID, the common signal (i.e., the PSS/SSS, CRS, etc. that are scrambled using the same PCID) is transmitted on the same resource from all TPs that have the same PCID.

As such, a plurality of TPs transmits the same signal using the same resource, and accordingly, the reception signal quality may be improved and the shaded area may be prevented. In addition, since a UE recognizes as if a single signal is transmitted from a single TP, the cell research or the handover is not performed by the UE for the same cluster/group, thereby the control signaling being decreased.

In order to obtain an additional cell-splitting gain between a plurality of TPs in the cluster/group, the specific identification information may be added to each of the TPs. This is called the Transmission Point ID (TPID). That is, in the case of transmitting a TP-specific signal (i.e., the RS that is scrambled with the TPID, etc.), the TP-specific signal may be transmitted independently to each of the TPs.

For example, each TPID may be used as the sequence scrambling initialization parameter of the CSI-RS that is transmitted from the corresponding TP, and may also be used for transmitting another TP-specific RS.

Hereinafter, in the present invention, the situation that each TP transmits the unique TP-specific discovery signal (hereinafter, referred to as the Discovery RS (DRS)) is considered.

Hereinafter, for the convenience of description, it is assumed and described that the DRS transmitted by each TP is the CSI-RS, but the present invention is not limited thereto. That is, the TP-specific RS except the CSI-RS may be defined and used in the present invention.

The use of the CSI-RS up to 3GPP LTE Release-11 standard is for a UE to measure the CSI and to perform the CSI feedback report, and the CSI-RS transmitted in the use is referred to as "FB-CSI-RS" below, for the convenience of description. In addition, the CSI-RS transmitted as a TP-specific DRS is referred to as "DRS-CSI-RS" that is distinguished from the FB-CSI-RS, for the convenience of description.

In addition, in the present invention, it is also considered that a cell ID (physical cell ID (PCID), a scramble ID for the CRS) is used for the scramble sequence ID of the DRS-CSI-RS. The Shared Cell ID exemplified above is a scenario that the TPID and the cell ID (i.e., PCID) may be differently given, but the present invention is not limited thereto.

Hereinafter, the discovery procedure using the Discovery Reference Signal (DRS) proposed in the present disclosure will be described in detail.

As described above, the discovery procedure based on the DRS is referred to as a series of processes performed by a UE including (1) receiving a DRS from at least one (small) cell or a Transport Point (TP), (2) performing a measurement using the received DRS, and (3) transmitting a measurement report to a BS.

Referring to FIGS. 17 to 20, the measurement method based on the DRS will be described in more detail.

Figure 17:
FIG. 17 is a diagram illustrating a measurement method based on the DRS proposed in the present disclosure.

FIG. 17 is a diagram illustrating a measurement method based on the DRS proposed in the present disclosure.

In order to perform a DRS measurement for at least one cell or a TP, a UE receives the DRS measurement timing configuration (DMTC) information from a BS or a network through the RRC signaling or the like.

Here, the UE may classify whether the subframe(s) in a specific duration is a normal subframe (non-MBSFN subframe) or an MBMS Single-Frequency Network (MBSFN) subframe using the DRS measurement timing configuration (DMTC) information.

In the case of the normal subframe, the DRS may be transmitted through multiple symbols, and in the case of the MBSFN subframe, the DRS may be transmitted only through a specific symbol.

As an example, in the case of the normal subframe, the DRS may be transmitted through $0^{th}$, $4^{th}$, $7^{th}$ and $11^{th}$ symbols, in the case of the MBSFN subframe, the DRS may be transmitted only through $0^{th}$ symbol.

Accordingly, by receiving the DRS measurement timing configuration information, the UE may not perform the operation for detecting the DRS unnecessarily on the symbol through which the DRS is not transmitted.

That is, the UE is prevented from performing an unnecessary operation for detecting the DRS in the MBMS Single-Frequency Network (MBSFN) subframe like the non-MBSFN subframe.

Here, the MBSFN transmission is referred to as the transmission which is seemed that the reception signals for a plurality of MBMS transmissions are transmitted through a multiple path channels on a single transmission point, not influencing as the inter-cell interference in the aspect of the UE, in the case that the MBMS transmissions from different cells are timely synchronized.

In addition, the UE may receive at least one type of DMTC information for each carrier frequency.

The DRS measurement timing configuration (DMTC) information is the information related to the time for measuring the DRS, and referred to as the information indicating when the UE performs the Radio Resource Management (RRM) measurement based on cell detection and the DRS.

In addition, the UE may detect a plurality of cells based on the DRS measurement timing configuration information through the current carrier frequency.

The DRS measurement timing configuration information includes at least one of the DRS measurement period information, the DRS measurement offset information or the DRS measurement duration information.

The DRS measurement period information is the information that represents the generation period of a DRS measurement window (or DRS measurement duration; 1710).

The DRS measurement offset information is referred to as the information indicating the starting point of the DRS measurement window.

The DRS measurement duration information is the information representing the duration in which the UE measures the DRS measurement, and may be interpreted as the same meaning as a length of the DRS measurement window.

The reference time of the DRS measurement offset may be the time of the primary serving cell.

As described above, the DMTC information may be configured for each carrier frequency or each cell.

In addition, the UE performs the measurement based on the DRS from the starting time of the DRS measurement window on a specific carrier frequency.

The DRS measurement window represents the duration for performing the DRS measurement, and may also be represented by the DRS measurement duration.

The starting point of the DRS measurement window may be determined according to the DRS measurement period and the DRS measurement offset.

The DMTC measurement window may represent the duration in which a cell or a TP may transmit the DRS or may mean the duration in which a UE may receive the DRS.

Here, the duration for transmitting the DRS or receiving the DRS actually is represented by a DRS occasion.

The measurement window is periodically shown depending on the measurement period.

Here, the measurement period may be 40 ms, 80 ms, 160 ms and so on.

That is, the UE perform the measurement based on the DRS, which is trying to detect one or more DRS occasion(s) existed in the DRS measurement window.

The DRS occasion 1720 means the DRS (burst) transmitted by a specific cell/TP in a specific carrier frequency.

That is, the DRS occasion occurs in a specific duration within the DRS measurement window.

In addition, the length (or duration) of the DRS occasion may be differently configured for each cell/TP.

Referring to FIG. 17, the DRS occasion length for cell/TP #0 is 2 subframes (SFs; 2 ms), the DRS occasion length for cell/TP #1 is 3 SFs (3 ms), and the DRS occasion length for cell/TP #2 is 4 SFs (4 ms).

In particular, cell/TP #0 transmits the DRS (PSS/SSS, CRS, CSI-RS) on subframe (SF) #0 and SF #1, and cell/TP #1 transmits the DRS (PSS/SSS, CRS, CSI-RS) on SF #0 to SF #2.

Here, cell/TP #1 may consecutively transmit the CRS only on SF #1, and may not transmit even the CRS on SF #1.

As described above, the DRS, that is, the discovery signal or the discovery reference signal may be the CRS or the CSI-RS.

In this case, the DRS may also be represented by DRS-CRS or DRS-CSI-RS.

Additionally, the following values may be supported. However, the values except the following values may be added or a part may be removed from the following values.

The period of the DMTC information may be at least one of 40 ms, 80 ms or 160 ms.

The DRS occasion duration is the same for all cells on a carrier frequency.

The DRS occasion (duration) may be defined as below.

FDD system: The duration of DRS occasion can be in the range of 1 and N1 subframe and is signaled per frequency to UEs.

TDD system: The duration of DRS occasion can be in the range of 2 and N2 subframe and is signaled per frequency to UEs.

N1 and N2 will be equal or less than 5, and RAN 1/4 will decide it.

RAN1 recommends RAN2 to prepare the maximum 5 values for FDD and 4 values for TDD for duration of DRS occasion.

RAN4 can limit combinations of duration, period, and BW among above configurations.

(CSI-RS multiplexing capacity for TDD and FDD should be considered to define N1 and N2 in RAN1)

Duration of DMTC is fixed to 6 msec.

This should not introduce scheduling restriction in the subframe within a DMTC duration that is not part of measurement gap.

In the case that a UE performs the discovery procedure through the DRS, the UE should acquire the MBSFN subframe configuration information of the cell that transmits the CRS in advance.

In the case that the CRS is transmitted through the MBSFN subframe, the UE performs a measurement only on OFDM symbol 0 of the MBSFN subframe.

The reason is because the CRS is transmitted only on OFDM symbol 0 (CRS port 0) in the case of the MBSFN subframe.

Accordingly, in the case that a UE is unable to acquire the MBSFN subframe configuration information for a neighbor cell in advance, the UE may also perform a measurement on the OFDM symbol except OFDM symbol 0 (e.g., OFDM symbol 4, 7, and/or 11 for normal CP, etc.) for the MBSFN subframe, like the case of the non-MBSFN subframe, and consequently, a problem may occur that a measurement is performed even on the symbol (or RE) on which there is no CRS transmission.

Accordingly, a UE should receive the MBSFN subframe configuration information of a neighbor cell in advance in order to perform a measurement for neighbor cells except a serving-cell, and the information may be transmitted with being included in the neighbor cell configuration (NeighCellConfig) information.

The neighbor cell configuration (NeighCellConfig) information may be transmitted through the RRC signaling, and may be included in SIB3, SIB5, MeasObjectEUTRA message as shown in the example below.

SystemInformationBlockType3

The IE SystemInformationBlockType3 contains cell re-selection information common for intra-frequency, inter-frequency and/or inter-RAT cell re-selection (i.e. applicable for more than one type of cell re-selection but not necessarily all) as well as intra-frequency cell re-selection information other than neighbouring cell related.

TABLE 6

<SystemInformationBlockType3 information element>

```
-- ASN1START
SystemInformationBlockType3 ::=        SEQUENCE {
...
    intraFreqCellReselectionInfo       SEQUENCE {
        q-RxLev-Min                    Q-RxLev-Min,
        p-Max                          P-Max               OPTIONAL,
        s-IntraSearch                  ReselectionThreshold
OPTIONAL,           -- Need OP
        allowedMeasBandwidth           AllowedMeasBandwidth
OPTIONAL,           -- Need OP
        presenceAntennaPort1           PresenceAntennaPort1,
        neighCellConfig                NeighCellConfig,
        t-ReselectionEUTRA             T-Reselection,
        t-ReselectionEUTRA-SF          SpeedStateScaleFactors
    },
    ...,
...
}
```

SystemInformationBlockType5

The IE SystemInformationBlockType5 contains information relevant only for inter-frequency cell re-selection i.e. information about other E-UTRA frequencies and inter-frequency neighbouring cells relevant for cell re-selection. The IE includes cell re-selection parameters common for a frequency as well as cell specific re-selection parameters.

TABLE 7

<SystemInformationBlockType5 information element>

```
...
InterFreqCarrierFreqInfo ::=           SEQUENCE {
    dl-CarrierFreq                     ARFCN-ValueEUTRA,
    q-RxLev-Min                        Q-RxLev-Min,
    p-Max                              P-Max               OPTIONAL,
    t-ReselectionEUTRA                 T-Reselection,
    t-ReselectionEUTRA-SF              SpeedStateScaleFactors
    threshX-High                       ReselectionThreshold,
    threshX-Low                        ReselectionThreshold,
    allowedMeasBandwidth               AllowedMeasBandwidth,
    presenceAntennaPort1               PresenceAntennaPort1,
    cellReselectionPriority            CellReselectionPriority
    neighCellConfig                    NeighCellConfig,
    q-OffsetFreq                       Q-OffsetRange
    DEFAULT dB0,
    interFreqNeighCellList             InterFreqNeighCellList
    interFreqBlackCellList             InterFreqBlackCellList
    ...,
[[ q-QualMin-r9                        Q-QualMin-r9
OPTIONAL,           -- Need OP
    threshX-Q-r9                       SEQUENCE {
        threshX-HighQ-r9               ReselectionThresholdQ-
r9,
        threshX-LowQ-r9                ReselectionThresholdQ-r9
    ]                                                      OPTIONAL
]],
[[ q-QualMinWB-r11                     Q-QualMin-r9
OPTIONAL    -- Cond WB-RSRQ
]]
}
...
```

MeasObjectEUTRA

TABLE 8

| <MeasObjectEUTRA information element> |
|---|

```
-- ASN1START
MeasObjectEUTRA ::=        SEQUENCE {
    carrierFreq               ARFCN-ValueEUTRA,
    allowedMeasBandwidth      AllowedMeasBandwidth,
    presenceAntennaPort1      PresenceAntennaPort1,
    neighCellConfig           NeighCellConfig,
    offsetFreq                Q-OffsetRange           DEFAULT
dB0,
    -- Cell list
    cellsToRemoveList         CellIndexList
OPTIONAL,     -- Need ON
    cellsToAddModList         CellsToAddModList
OPTIONAL,     -- Need ON
    -- Black list
    blackCellsToRemoveList    CellIndexList
OPTIONAL,     -- Need ON
    blackCellsToAddModList    BlackCellsToAddModList
    cellForWhichToReportCGI   PhysCellId
OPTIONAL,     -- Need ON
    ...,
    [ [measCycleSCell-r10     MeasCycleSCell-r10
OPTIONAL,     -- Need ON
    measSubframePatternConfigNeigh-r10
MeasSubframePatternConfigNeigh-r10 OPTIONAL
    ] ],
    [ [widebandRSRQ-Meas-r11  BOOLEAN OPTIONAL       --
Cond WB-RSRQ
    ] ]
}
...
```

An example of the neighbor cell configuration (NeighCellConfig) information included in the SIB3, SIB5 and MeasObjectEUTRA message described above may be as follows.

NeighCellConfig

The IE NeighCellConfig is used to provide the information related to MBSFN and TDD UL/DL configuration of neighbor cells.

TABLE 9

| <NeighCellConfig information element> |
|---|

```
-- ASN1START
NeighCellConfig ::=        BIT STRING (SIZE (2))
-- ASN1STOP
```

TABLE 10

| NeighCellConfig field descriptions |
|---|
| NeighCellConfig field descriptions | neighCellConfig
Provides information related to MBSFN and TDD UL/DL
configuration of neighbour cells of this frequency
00: Not all neighbour cells have the same MBSFN subframe
allocation as the serving cell on this frequency, if configured,
and as the PCell otherwise
10: The MBSFN subframe allocations of all neighbour cells are
identical to or subsets of that in the serving cell on this
frequency, if configured, and of that in the PCell otherwise
01: No MBSFN subframes are present in all neighbour cells
11: Different UL/DL allocation in neighbouring cells for TDD
compared to the serving cell on this frequency, if configured,
and compared to the PCell otherwise
For TDD, 00, 10 and 01 are only used for same UL/DL
allocation in neighbouring cells compared to the serving cell on
this frequency, if configured, and compared to the PCell
otherwise.

As described above, in the case that the NeighCellConfig information is transmitted to a UE with being included in SIB3 and SIB 5, when performing a measurement for the non-serving cells according to the corresponding NeighCellConfig information, the UE is able to know which MBSFN subframe configuration the non-serving cells have even before receiving the UE-dedicated RRC signaling.

Otherwise, in the case that the UE receives the MeasObjectEUTRA message including the NeighCellConfig information, when performing a measurement for the non-serving cells according to the NeighCellConfig information included in the MeasObjectEUTRA message for the corresponding frequency (indicated by ARFCN-ValueEUTRA), the UE is able to know which MBSFN subframe configuration the non-serving cells have.

The NeighCellConfig information may be configured as 2 bits, and transmitted to the UE with being configured as the value of '00', '01', '10' and '11'.

The description for the value of '00', '01', '10' and '11' refers to the NeighCellConfig field descriptions described above.

In summary of the description, when a serving cell is configured on the carrier frequency for performing the DRS measurement (serving cell: f1, f2, f3, DRS measurement carrier: f3), a BS compares the MBSFN subframe configuration indicated by the corresponding serving cell (f3) with the MBSFN subframe configuration of the neighbor cells, and transmits the information on whether the configuration is the same or not to the UE.

In the case that the serving cell is not configured on the carrier frequency for performing the DRS measurement (serving cell: f1, f2, DRS measurement carrier: f3), the BS compares the MBSFN subframe configuration indicated by a PCell with the MBSFN subframe configuration of the neighbor cells, and transmits the information on whether the configuration is the same or not to the UE.

In addition, the NeighCellConfig information includes the information of the TDD UL/DL configuration of the neighbor cells as well as the MBSFN subframe configuration of the neighbor cells.

That is, in the case that the NeighCellConfig field value is '00', '01' and '10', the same TDD UL/DL allocation may also be applied to the non-serving cell, and in the case that the NeighCellConfig field value is '11', the same TDD UL/DL allocation may not be applied to the non-serving cell.

Next, a method for configuring the NeighCellConfig information in a simpler form using a bitmap and transmitting it through the RRC signaling will be described.

There may be a restriction in the case of directly applying the NeighCellConfig information described above to the discovery procedure proposed in the present disclosure.

The reason is because the NeighCellConfig information indicates only the information on whether the MBSFN subframe configuration of the PCell (or configured serving-cell) and the MBSFN subframe configuration of the neighbor cells are the same or different, but for the different case, any detailed information on how different is not provided.

In addition, whereas the MBSFN subframe configuration transmitted through the NeighCellConfig information is in the bitmap form of 40 ms normally, the information required within the DRS measurement window (e.g., 1 to 5 ms) proposed in the present disclosure is much shorter than it.

Accordingly, since it is enough to transmit the related information to a UE by configuring the bitmap of a length shorter than the bitmap length of 40 ms, a method for configuring the NeighCellConfig information in a simple form of the bitmap and performing the RRC signaling will be described below.

That is, the method that will be described below represents the method for notifying the number of CRS symbols directly or by connecting the MBSFN (MBMS) subframe configuration information with the TDD DL/UL/special subframe configuration information for each of the subframes included in the DRS measurement window (duration) or the DRS occasion.

In order for a UE to guarantee the position of the DL subframes and/or the DwPTS of special subframes (in case of TDD) that may perform the RRM (Radio Resource Management) measurement (e.g., DRS-RSRP, DRS-RSSI, and/or DRS-RSRQ, etc.) based on the DRS, there may be a method for explicitly signaling the information of the corresponding subframes to the UE.

However, it may be implemented that (in the TDD) a UE may assume at least one of the operations below, and accordingly, the UE may perform the RRM measurement based on the DRS in the corresponding subframes at the least.

If Duration of DRS occasion is configured/signaled to a UE on a frequency with the range of 1 and N_2 subframe, the UE can assume the N_2 subframe is DL subframe or DwPTS of special subframe, so that the UE ensures that it can perform DRS-based RRM measurement (e.g., calculating DRS-RSRP, DRS-RSSI, and/or DRS-RSRQ) on the N_2 subframe.

If Duration of DRS occasion is configured/signaled to a UE on a frequency with the range of 1 and N_2 subframe, the UE can assume the 1st subframe is DL subframe (or DwPTS of special subframe), so that the UE ensures that it can perform DRS-based RRM measurement (e.g., calculating DRS-RSRP, DRS-RSSI, and/or DRS-RSRQ) on the 1st subframe.

If Duration of DRS occasion is configured/signaled to a UE on a frequency with the range of 1 and N_2 subframe, the UE can assume the 1st subframe and the N_2 subframe are DL subframe(s) and/or DwPTS of special subframe(s), so that the UE ensures that it can perform DRS-based RRM measurement (e.g., calculating DRS-RSRP, DRS-RSSI, and/or DRS-RSRQ) on the 1st subframe and the N_2 subframe.

If Duration of DRS occasion is configured/signaled to a UE on a frequency with the range of 1 and N_2 subframe, the UE can assume the 1st subframe is DL subframe, and the N_2 subframe is DL subframe or DwPTS of special subframe, so that the UE ensures that it can perform DRS-based RRM measurement (e.g., calculating DRS-RSRP, DRS-RSSI, and/or DRS-RSRQ) on the 1st subframe and the N_2 subframe.

The operations described above may be valid only when the assumption, "Different UL/DL allocation in neighbouring cells for TDD compared to the serving cell on this frequency, if configured, and compared to the PCell otherwise" is satisfied for the UE to receive the neighCellConfig information having the value of '11'.

Otherwise, the operations may be limited so as to satisfy the assumption, "Different UL/DL allocation in neighbouring cells for TDD compared to the serving cell on this frequency, if configured, and compared to the PCell otherwise" only in the case that the UE receives the neighCellConfig information having the value '11'.

In the case that the UE receives the neighCellConfig information having a value ('00', '01' or '10') except the value of '11', it may be implemented to identify the subframe(s) for performing a measurement and/or the DwPTS of special subframe based on the DRS according to the TDD UL/DL configuration that may be assumed (to be the UL/DL configuration such as serving cell on this frequency, if configured, and compared to the PCell otherwise) for the cell that is an object of the measurement based on the DRS, and accordingly, to follow the operation of performing the DRS measurement.

Figure 18:
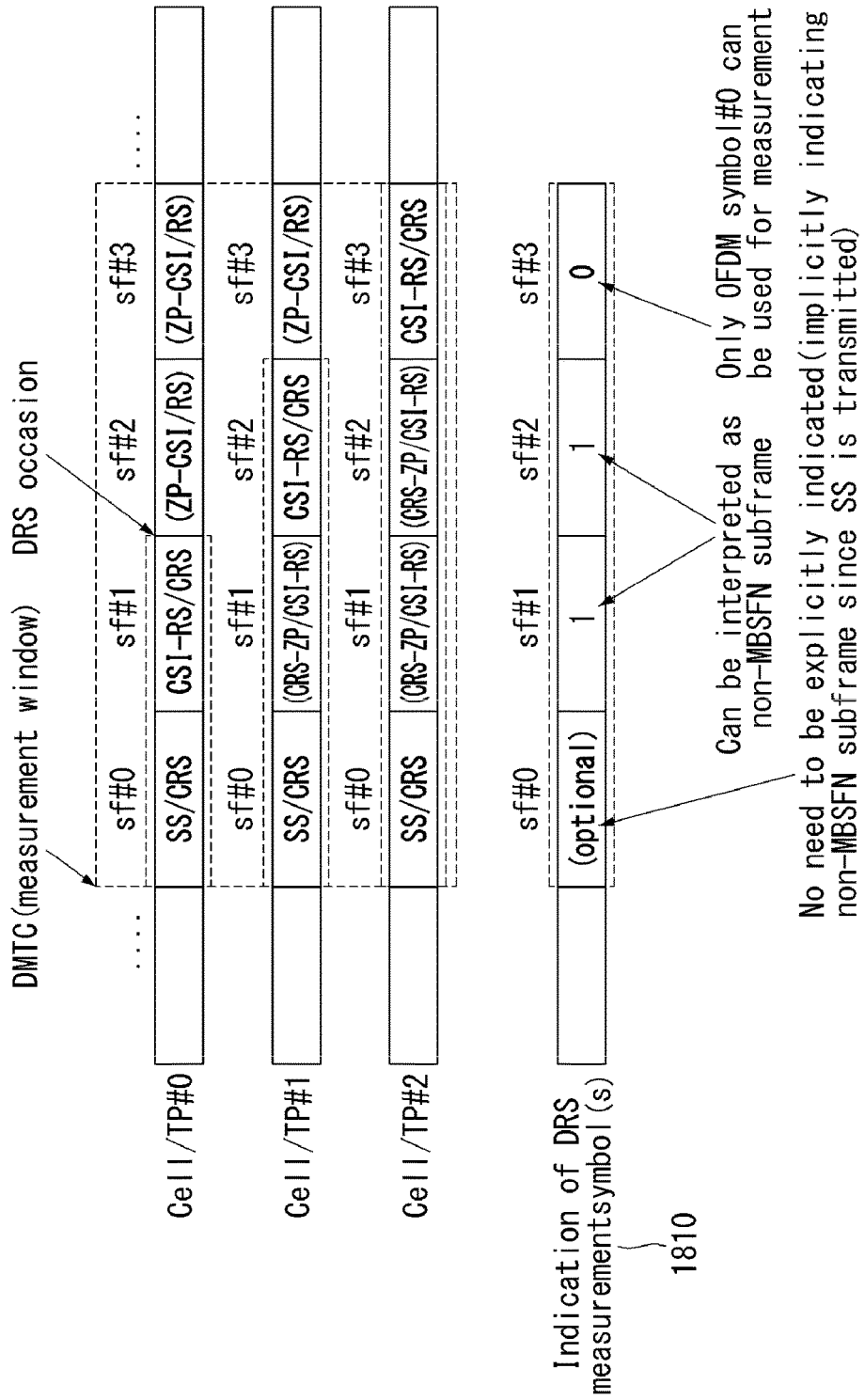
FIG. 18 is a diagram illustrating another example of a measurement method based on the DRS proposed in the present disclosure.

FIG. 18 is a diagram illustrating another example of a measurement method based on the DRS proposed in the present disclosure.

FIG. 18 shows a method for transmitting the Indication of DRS measurement symbol(s) (IDMS; 1810) separately from the neighCellConfig information so as to perform a measurement based on the DRS.

The IDMS information, that is, the indication information indicating the DRS measurement symbol may be RRC signaling for each carrier frequency with being included in the DMTC information.

Otherwise, the IDMS information may be transmitted to a UE through the RRC message separately from the DMTC information.

For example, in the case that the explicit RRC configuration for the DRS occasion related to the DRS transmission or reception duration is provided, the IDMS information may be transmitted with being included in the RRC configuration related to the DRS occasion.

As shown in FIG. 18B, the IDMS information indicating the DRS measurement symbol may have the size of 3 bits or 4 bits. This is just an example, and the IDMS information may be configured to be greater or smaller than 3 bits or 4 bits.

The IDMS information of 4 bits includes an optional bit, and the optional bit corresponds to the SF on which a synchronization signal is transmitted, and always set to '1'. The meaning of the value '1' represents that the corresponding SF is the non-MBSFN subframe.

Accordingly, in the case that the IDMS information does not include the optional bit, the size is 3 bits.

FIG. 18B shows an example of the IDMS information of 3 bits.

Referring to FIG. 18B, the IDMS information may be configured as a bitmap form of 3 bits size, and the value may be set to (1 1 0).

Each of the bit value of 3 bits bitmap corresponds to each of the subframes except the SF (e.g., SF #0) in which the synchronization signal (PSS/SSS) is detected within the DRS measurement window.

That is, each of the IDMS value for SF #1 and SF #2 represents '1', and the IDMS value for SF #3 represents '0'.

Here, the meaning of '1' and '0' that represent each of the bit value in the bitmap of the IDMS information may be defined as below.

However, the values '1' and '0' are just an example and the meaning of '1' and '0' may be exchanged or mapped to different values.

(1) The bit value is '1' in the bitmap of the IDMS information may be interpreted or defined as at least one of the following meanings.
① Represent the non-MBSFN subframe (or normal subframe)
② In the subframe that corresponds to the bit value, (in the case of the normal CP) it may be defined that CRS port 0 is transmitted in all of OFDM symbols 0, 4, 7 and 11. In the case of the extended CP, CRS port 0 is transmitted in all of OFDM symbols 0, 3, 6 and 9.
In the case that CRS port 1 is also able to be detected, it may be defined that CRS port 1 is transmitted with being v-shifted in the same OFDM symbols as those of CRS port 0.
③ The subframe that corresponds to the bit value may be defined to be a DL subframe (or special subframe) in even the TDD.
In this case, how many number of the OFDM symbols are available in the DwPTS region in the case of the special subframe for a DRS measurement may be separately defined or configured, or a special default value (e.g., 1 or 3) may be defined.
Otherwise, in the case that the NeighCellConfig information is transmitted to a UE for the corresponding carrier frequency, it may be defined/configured to as following the NeighCellConfig information.
④ It may be represented that the subframe corresponding to the bit value is included in a "restricted measurement set".
That is, it may be implemented that a measurement and a report are performed only in the subframes included in the corresponding restricted measurement set when performing the RRM (and/or RLM) measurement such as RSRQ, RSSI, and/or RSSI, and so on. It may be the concept for the existing eICIC use, and the like, for example, the concept that replaces the restricted measurement set indicated as measSubframePatternNeigh-r10 information in MeasSubframePatternConfigNeigh-r10 which is included in MeasObjectEUTRA IE.
That is, it is indicated by the bitmap (e.g., 1, 2, . . . , or 5-bit bitmap) that is applied only during the DMTC measurement window and/or DRS occasion, not the bitmap for all subframes (e.g., represented by a unit of 40 ms) such as the measSubframePatternNeigh-r10, and the restricted measurement may be applied only during the corresponding duration. And, a UE may assume that the corresponding subframe is the non-MBSFN subframes.

(2) In the case that the bit value is '0' in the bitmap of the IDMS information, it may be interpreted/defined as one of the following meanings.
① Represent the MBSFN subframe
② In the subframe that corresponds to the bit value, (in the case of the normal CP) it may be defined that CRS port 0 is transmitted only in OFDM symbol 0. Represent that CRS port 0 is transmitted only in OFDM symbol 0 in the case of the extended CP. In the case that CRS port 1 is also available to be detected, it may represented that CRS port 1 is transmitted with being v-shifted in the same OFDM symbols as those of CRS port 0.
③ The subframe corresponding to the bit value may represent a UL subframe (or special subframe) in the case of TDD.
In this case, how many number of the OFDM symbols are available in the DwPTS region in the case of the special subframe for a DRS measurement may be separately defined or configured, or a special default value (e.g., 1 or 3) may be defined.
Otherwise, in the case that the NeighCellConfig information is provided for the corresponding carrier frequency, it may be defined/configured as following the NeighCellConfig information.
④ It may be represented that the corresponding subframe is not included in the restricted measurement set.

The third meaning (③) in each of the meaning of the values '1' and '0', that is, the meaning related to "special subframe" may be defined to be included in either one of '1' or '0'.

As described above, in the case that a UE receives the IDMS information through the RRC signaling separately from the DMTC information, when performing a measurement based on the DRS, it may be defined that the UE may ignore the NeighCellConfig information transmitted from a DRS measurement related BS, and perform the DRS measurement based on the IDMS information.

That is, the IDMS information may override the NeighCellConfig information which is already received.

However, the UE may be defined/configured to perform the DRS measurement based on the NeighCellConfig information for the special subframe related operation, and so on, exceptionally.

As described above, the size of bitmap that represents the IDMS information may be 4 bits.

In this case, for the IDMS information, the value '1' or '0' is set explicitly to the subframe on which the synchronization signal (PSS/SSS) is transmitted.

As another example, a method for implicitly indicating to the UE may be available by always setting '1' to the subframe on which the synchronization signal (PSS/SSS) is transmitted (e.g., at least one operation among the description in relation to '1' above is always applied to the corresponding subframe), by being excluded in the IDMS bitmap for the subframe on which the synchronization signal (PSS/SSS) is transmitted.

Next, in the case that the synchronization signal (PSS/SSS) is transmitted in different subframes for each cell/TP, a method for configuring the DRS measurement related information will be described.

Figure 19:
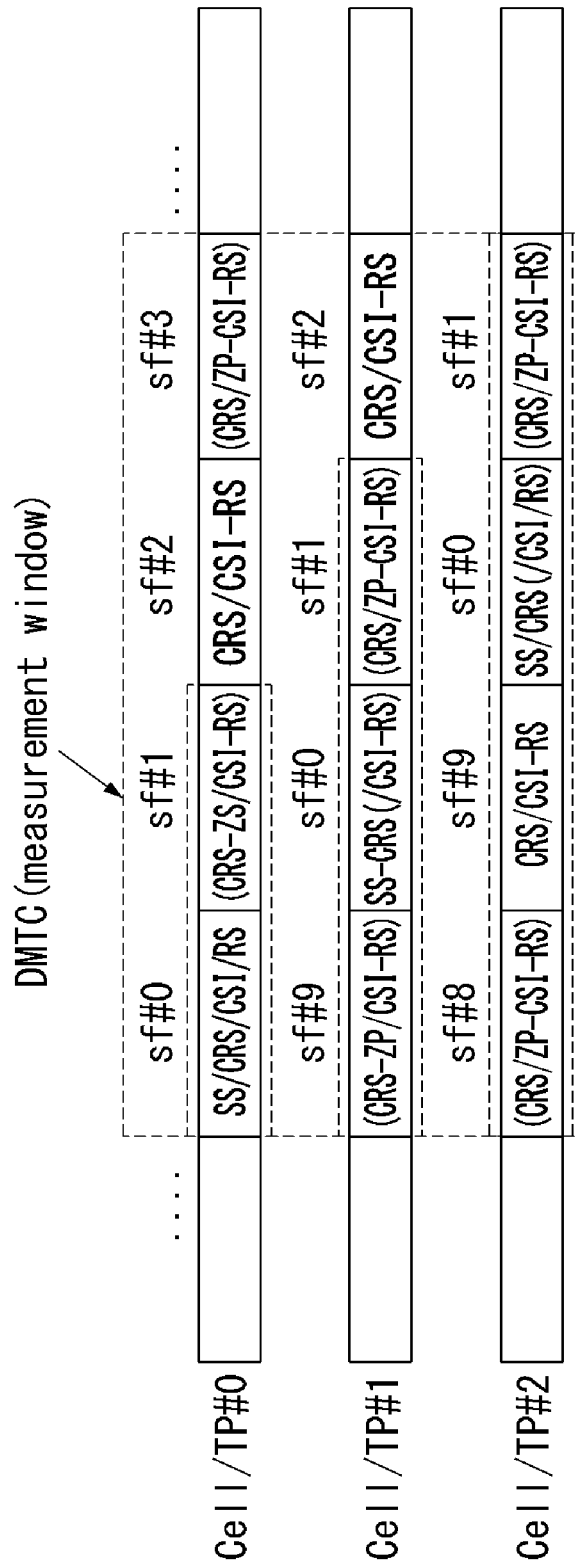
FIG. 19 is a diagram illustrating another example of a measurement method based on the DRS proposed in the present disclosure.

FIG. 19 is a diagram illustrating another example of a measurement method based on the DRS proposed in the present disclosure.

That is, FIG. 19 shows a method for performing the DRS measurement in the case that the synchronization signal is transmitted in different subframes for each cell/TP within the DRS measurement window.

Here, it is assumed that the IDMS information is transmitted to a UE by being configured as the bitmap of 3 bits.

As an example, the bitmap of the IDMS information may be expressed by (x, y, z), and the meaning of each of the bits (x, y, z) may be interpreted as below.

Here, in the case of the subframe on which the synchronization signal (PSS/SSS) is detected, it is assumed that the bit value of the bitmap representing the IDMS information that corresponds to the corresponding subframe has '1' always.

It is assumed that at least one operation among the meanings of the value '1' described above is applied to the subframe that corresponds to the value '1'.

'x', 'y' and 'z' are sequentially mapped from the subframe (SF #N+1) which is the next to the subframe (SF #N) on which the synchronization signal (PSS/SSS) is detected.

For example, in the case of cell/TP #0 in FIG. 19, 'x' is mapped to SF #1, 'y' is mapped to SF #2, and 'z' is mapped to SF #3, respectively.

That is, each of the values of 'x', 'y' and 'z' represents the IDMS information in SF #1, SF #2 and SF #3, respectively.

Here, in the case that the last duration (subframe) of the DMTC measurement window is shown, the next is mapped to the starting duration (subframe) of the DMTC measurement window (in the form of cyclic shift).

For example, in the case of cell/TP #1 in FIG. 19, 'x' is mapped to SF #1, 'y' is mapped to SF #2, and 'z' is mapped to SF #9.

In the case of cell/TP #2, is mapped to SF #1, 'y' is mapped to SF #8, and 'z' is mapped to SF #9.

As another interpretation, it may be defined/configured that it is mapped from the first subframe shown in the DMTC measurement window, but has the form that the subframe (SF #N) on which the synchronization signal (PSS/SSS) is detected is skipped (or omitted).

For example, in the case of cell/TP #0 in FIG. 19, 'x' is mapped to SF #1, 'y' is mapped to SF #2, and 'z' is mapped to SF #3.

In the case of cell/TP #1, is mapped to SF #9, 'y' is mapped to SF #1, and 'z' is mapped to SF #2.

In the case of cell/TP #2, 'x' is mapped to SF #8, 'y' is mapped to SF #9, and 'z' is mapped to SF #1.

Here, as described above, the UE may interpret the bitmap mapping of the IDMS information within the DRS measurement window, but it may be defined that the UE may interpret the bitmap mapping of the IDMS information regardless of the DRS measurement window duration.

For example, in the case that a BS transmits the configuration of the DRS occasion (for a specific cell/TP) to a UE by the explicit RRC signaling and the IDMS information is included in the DRS occasion, the UE may apply the bitmap mapping of the IDMS information during the subframe duration indicated by the DRS occasion.

Even in this case, the subframe on which the synchronization signal (PSS/SSS) is transmitted at the DRS occasion may be excluded from the bitmap of the IDMS information.

For example, when assuming that the duration of the DRS occasion is K ms, the size of the bitmap of the IDMS information may be K. Or, in the case that the number of subframe on which the synchronization signal (PSS/SSS) is transmitted is p, the size of the bitmap of the IDMS information may be K-p.

Here, with respect to the subframe on which the synchronization signal (PSS/SSS) is transmitted, the bit value may be set to '1' always.

In the case of the FDD, the number of p values may be one, and in the case of the TDD, the number of p values may be two.

In the case that it is defined that the subframe on which the synchronization signal (PSS/SSS) is transmitted is transmitted in a single subframe even for the TDD, the number of p values may be one.

As another embodiment, the use of the bitmap of the IDMS information may be defined or configured to indicate whether even a single MBSFN subframe is existed in the subframes which are belonged to the DMTC measurement window duration or the DRS occasion duration in order to decrease the signaling for transmitting the IDMS information.

As another embodiment, the case in relation to the DL/UL configuration in the TDD will be described for each carrier frequency.

First, it may be assumed that the DL/UL configuration of the TDD is the same for each carrier frequency.

Accordingly, in the case that a specific carrier frequency is configured for the serving cell of a UE, the TDD DL/UL configuration of the neighbor cells on the specific carrier frequency follows the TDD DL/UL configuration of the corresponding serving cell. In the case that a specific carrier frequency is not configured for the serving cell of a UE, the TDD DL/UL configuration of the neighbor cells on the corresponding carrier frequency may be differently configured from the TDD DL/UL configuration of the serving cell and given to the UE.

In the case that the UE is unable to know the TDD DL/UL configuration of neighbor cells/CPs on the specific carrier frequency, the UE may assume that the CRS is transmitted only in the subframe on which the synchronization signal (PSS/SSS) is transmitted.

For the RRC signaling of the current NeighCellConfig information, the value '00', '01' and '10' (value of NeighCellConfig information) are valid only in the case that the DL/UL configuration is the same for the TDD.

However, in the case that the FDD is the PCell in the FDD-TDD CA environment, even though transmitting the NeighCellConfig information to the UE, it is unable to provide the new information in relation to the TDD DL/UL configuration on the specific carrier frequency to the UE.

Accordingly, hereinafter, in the case that the FDD is the PCell in the FDD-TDD CA environment, and in the case that the NeighCellConfig information, especially, the value of NeighCellConfig information have '00', '01' and '10', a method for defining the corresponding value, which is different from the description above, will be described.

In the case that the PCell is made up of the FDD and the specific carrier frequency is made up of the TDD, the value of NeighCellConfig information may be defined or interpreted as shown in Table 11 below.

Here, the specific carrier frequency means the carrier frequency on which the UE measures the DRS.

TABLE 11

| Value | Description |
|---|---|
| 00 | Not all neighbour cells have the same MBSFN subframe allocation as the serving cell on this frequency, if configured, and as the PCell otherwise |

TABLE 11-continued

| Value | Description |
|---|---|
| 01 | if the serving cell on this frequency is configured, DL subframe allocation of neighbor cells are identical or supersets of that of the serving cell on this frequency (and MBSFN configuration can be different). Otherwise, follow Rel-8 definition |
| 10 | if the serving cell on this frequency is configured, normal DL subframe allocation (i.e., non-MBSFN subframe, non-special subframe) of neighbor cells are identical or supersets of that in the serving cell on this frequency. Otherwise, follow Rel-8 definition |
| 11 | Different UL/DL allocation in neighbouring cells for TDD compared to the serving cell on this frequency, if configured, and compared to the PCell otherwise |

Table 11 may be identically applied to the case that the PCell is the TDD. In the case that a UE acquires the MBSFN subframe structure (or configuration) of neighbor cells/TPs through the RRC signaling defined in 3GPP Rel-8 (LTE) standard or a new RRC signaling, the way how the CRS is transmitted in the subframe in which the CSI-RS (DRS-CSI-RS) for the DRS use (whether it is transmitted on four symbols or only one symbol) may be defined/configured through the MBSFN subframe configuration information.

That is, by identifying the MBSFN subframe configuration information for the neighbor cells/TPs acquired through the RRC signaling, the UE may know the transmission form of the CRS (the number of symbols on which the CRS is transmitted in a specific subframe).

As a result of the identification, in the case that the DRS measurement subframe corresponds to the MBSFN subframe, the CRS is transmitted on only one symbol (e.g., symbol 0) of the DRS measurement subframe, and the UE may perform the DRS measurement through the corresponding symbol.

Otherwise, (as a default operation) it may be defined/configured in advance that the DRS-CSI-RS is not transmitted in the MBSFN subframe.

As described above, the reason why the DRS-CSI-RS is not transmitted in the MBSFN subframe in advance is because it may be difficult for a BS (or network) to transmit a cell-specific/TP-specific DRS-CSI-RS to the UE by considering whether all of the UE receives an individual Physical Multicast Channel (PMCH).

That is, only the UEs that do not receive the PMCH may receive the DRS-CSI-RS in the MBSFN subframe, but it may be impossible for the BS to transmit the cell-specific/TP-specific DRS-CSI-RS to all UEs by identifying whether all UEs are in such a situation.

Accordingly, a UE assumes that the subframe in which the DRS-CSI-RS is transmitted is the non-MBSFN subframe always, and the UE identifies that the CRS is transmitted in the form of normal subframe in the subframe on which the DRS-CSI-RS is detected.

That is, the UE may know that the CRS is transmitted through multiple OFDM symbols in the subframe on which the DRS-CSI-RS is detected, and may perform a DRS measurement through the corresponding OFDM symbols.

As described above, in the subframes included in the DRS measurement window or the DRS occasion duration, the IDMS information in the bitmap form that indicates the number of DRS measurement symbols in each subframe may be defined/configured as the use of indicating a specific restricted measurement (e.g., the use as the same as the restricted measurement set in the conventional eICIC, etc.) as well as the use of notifying the number of CRS symbols in each subframe directly or notifying it with being connected with the MBSFN configuration and the TDD DL/UL/special subframe configuration.

As an example, the "measurement subframe set" may be configured by gathering the subframes indicated by '1' in the IDMS information of the bitmap form, or it may be implemented that at least one RRM measurement (and/or RLM measurement) among RSRQ and RSSI or RSS is performed only for the measurement subframe set, and that the measurement result is reported.

In the case that the bitmap of the IDMS information is transmitted to a UE with being included in the MeasObjectEUTRA IE described above (e.g., the information such as the DMTC period, offset, window, and/or, DRS occasion are included in the MeasObjectEUTRA IE), the UE recognizes that the bitmap of the IDMS information included in the received MeasObjectEUTRA IE replaces the information of MeasSubframePatternConfigNeigh-r10, measSubframePatternNeigh-r10 and/or measSubframeCellList-r10 defined in the existing LTE release-10.

Accordingly, in the case that the UE receives the bitmap of the IDMS information together with the information (MeasSubframePatternConfigNeigh-r10, measSubframePatternNeigh-r10 and/or measSubframeCellList-r10) defined in the existing LTE release-10, the UE determines that the UE receives wrongly configured information.

That is, in the case that the bitmap of the IDMS information is transmitted to a UE with being included in the MeasObjectEUTRA IE, the existing information related to MeasSubframePatternConfigNeigh-r10 may not be transmitted to the UE.

Or, in the case that the UE receives both of the bitmap of the IDMS information and the existing information related to MeasSubframePatternConfigNeigh-r10, the UE may assume that the existing measSubframeCellList-r10 is not in relation to the cell for the measurement based on the DRS.

In other words, it may be recognized that the cells in the existing measSubframeCellList-r10 are legacy cells and are objects for performing the legacy CRS-based measurement, and the information in relation to the IDMS information bitmap, DMTC period, offset, window, DRS occasion, and so on is the information which is applied to the cells except the cell indicated by measSubframeCellList-r10.

Figure 20:
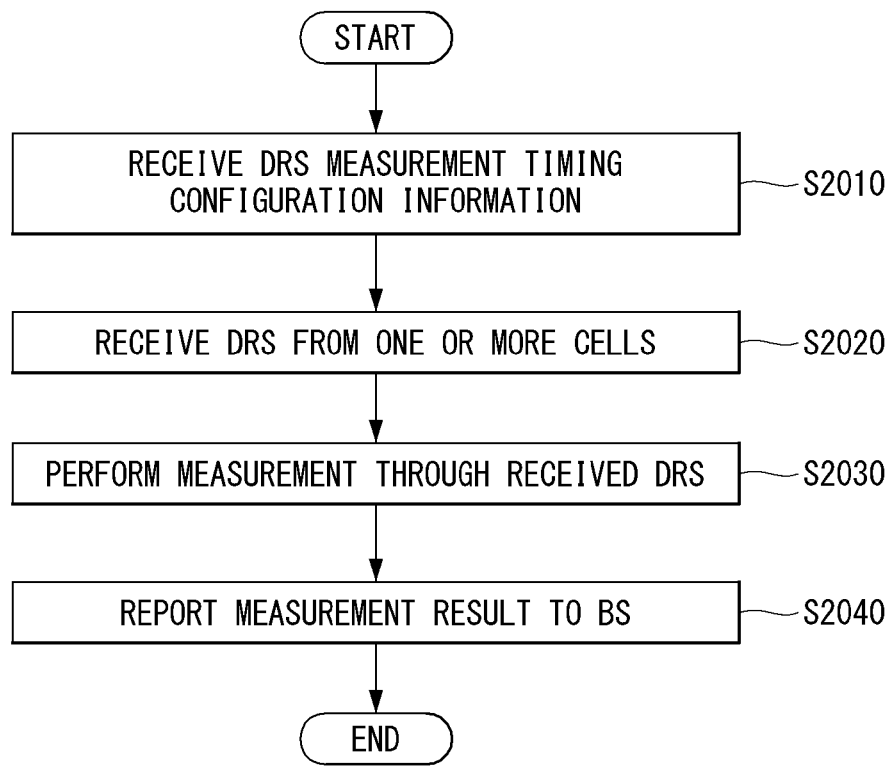
FIG. 20 is a flowchart illustrating an example of a method for performing a measurement based on the DRS proposed in the present disclosure.

FIG. 20 is a flowchart illustrating an example of a method for performing a measurement based on the DRS proposed in the present disclosure.

Referring to FIG. 20, a UE receives the DRS Measurement Timing Configuration (DMTC) information in relation to the DRS measurement time in order to perform the measurement using the DRS from a BS (step, S2010).

The DRS Measurement Timing Configuration information includes at least one of the DRS measurement duration information that represents a length of the DRS measurement window, the DRS measurement offset information that represents the starting point of the DRS measurement window or the DRS measurement period information that represents the occurrence period of the DRS measurement window.

In addition, the DRS Measurement Timing Configuration information may further include the DRS occasion information that represents the duration in which the DRS is transmitted or received within the DRS measurement window.

Furthermore, the DRS Measurement Timing Configuration information may be configured for each cell and/or for each carrier frequency.

Later, the UE receives the DRS from one or more cells based on the received DRS Measurement Timing Configuration information, particularly, through a specific carrier frequency within the DRS measurement window (step, S2020).

Here, the UE may further receive the MBSFN subframe configuration information related to the MBMS Single-Frequency Network (MBSFN) subframe configuration for the one or more cells from the BS.

The MBSFN subframe configuration information is referred to as the information that represents whether the subframe within the DRS measurement window is the MBSFN subframe or the non-MBSFN subframe.

In the case of the non-MBSFN subframe, the UE receives the DRS through multiple symbols of the corresponding subframe, and in the case of the MBSFN subframe, the UE receives the DRS only in a single symbol of the corresponding subframe.

In addition, the MBSFN subframe configuration information may be included in the neighbor cell configuration (NeighCellConfig) information.

The neighbor cell configuration (NeighCellConfig) information may be transmitted through System Information Block (SIB) 3, SIB5 or MeasObjectEUTRA.

Additionally, the UE may further receive the Indication of DRS Measurement Symbol (IDMS) information that indicates the DRS measurement symbol from the BS.

The Indication of DRS Measurement Symbol information may be expressed by a bitmap form, and each bit value of the DRS Measurement Symbol information corresponds to each of the subframes within the DRS measurement window.

The Indication of DRS Measurement Symbol information may not include the bit value that corresponds to the subframe on which the synchronization signal is received.

In addition, the Indication of DRS Measurement Symbol information may be received from the BS or network separately from the MBSFN subframe configuration information.

Later, the UE performs a measurement through the received DRS (step, S2030).

Then, the UE reports the measurement result to the BS (step, S2040).

General Apparatus to which the Present Invention May be Applied

Figure 21:
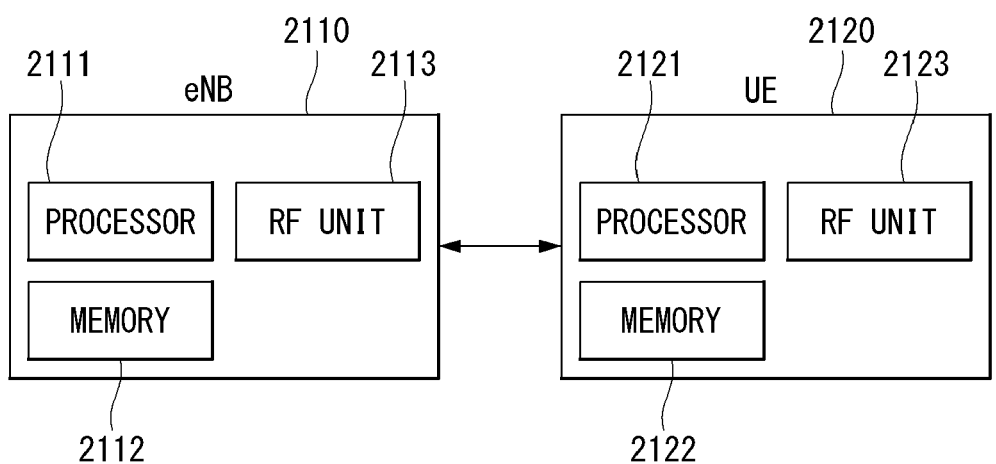
FIG. 21 illustrates a block diagram of a wireless communication apparatus according to an embodiment of the present invention.

FIG. 21 illustrates a block diagram of a wireless communication apparatus according to an embodiment of the present invention.

Referring to FIG. 21, the wireless communication system includes a BS (eNB) 2110 and a plurality of user equipments (UEs) 2120 located within the region of the eNB 2110.

The eNB 2110 includes a processor 2111, a memory 2112 and a radio frequency unit 2113. The processor 2111 implements the functions, processes and/or methods proposed in FIGS. 1 to 20 above. The layers of wireless interface protocol may be implemented by the processor 2111. The memory 2112 is connected to the processor 2111, and stores various types of information for driving the processor 2111. The RF unit 2113 is connected to the processor 2111, and transmits and/or receives radio signals.

The UE 2120 includes a processor 2121, a memory 2122 and a radio frequency unit 2123. The processor 2121 implements the functions, processes and/or methods proposed in FIGS. 1 to 20 above. The layers of wireless interface protocol may be implemented by the processor 2121. The memory 2122 is connected to the processor 2121, and stores various types of information for driving the processor 2121. The RF unit 2123 is connected to the processor 2121, and transmits and/or receives radio signals.

The memories 2112 and 2122 may be located interior or exterior of the processors 2111 and 2121, and may be connected to the processors 2111 and 2121 with well known means. In addition, the eNB 2110 and/or the UE 2120 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The method for performing a measurement based on the discovery signal in a wireless communication system of the present invention has been described mainly with the example applied to 3GPP LTE/LTE-A system, but may also be applied to various wireless communication systems except the 3GPP LTE/LTE-A system.

The invention claimed is:

1. A method for performing, by a user equipment (UE), a measurement using a Discovery Reference Signal (DRS) in a wireless communication system, the method comprising:
   receiving, from a base station (BS), a radio resource control (RRC) signaling related to a DRS Measurement Timing Configuration (DMTC);

receiving, from one or more cells, the DRS in a DRS occasion of a DRS measurement window for a specific carrier frequency based on the received RRC signaling;

performing a measurement using the received DRS; and reporting, to the BS, a result of the measurement, wherein the RRC signaling includes DRS measurement offset information related to a starting point of the DRS measurement window and DRS measurement period information related to an occurrence period of the DRS measurement window, wherein a first subframe of the DRS measurement window is determined based on the DRS measurement offset information and the DRS measurement period information, and wherein a period of the DRS measurement window includes 40ms, 80ms and 160ms.

2. The method of claim 1, wherein the RRC signaling further includes DRS occasion information related to a duration in which the DRS is transmitted or received in the DRS measurement window.

3. The method of claim 1, further comprising:

receiving, from the BS, Indication of DRS Measurement Symbol (IDMS) information related to a position of a DRS measurement symbol in one or more subframes included in the DRS measurement window for the specific carrier frequency.

4. The method of claim 3, wherein the Indication of DRS Measurement Symbol information is expressed by a bitmap form.

5. The method of claim 4, wherein each bit value of the Indication of DRS Measurement Symbol information corresponds to each of the one or more subframes included in the DRS measurement window.

6. The method of claim 4, wherein the Indication of DRS Measurement Symbol information does not include a bit value corresponding to a subframe on which a synchronization signal is received.

7. The method of claim 4, wherein each bit value of the Indication of DRS Measurement Symbol information represents whether a subframe corresponding to the each bit value is a Multimedia Broadcast Multicast Services (MBMS) Single-Frequency Network (MBSFN) subframe or a non-MBSFN subframe.

8. The method of claim 3, wherein the Indication of DRS Measurement Symbol information is received separately from Multimedia Broadcast Multicast Services (MBMS) Single-Frequency Network (MBSFN) subframe configuration information.

9. The method of claim 1, wherein the DRS is a signal for discovering on-state or off-state of the one or more cells, and is either one of Common Reference Signal (CRS) or a Channel State Information-Reference Signal (CSI-RS).

10. A user equipment (UE) for performing a measurement using a Discovery Reference Signal (DRS) in a wireless communication system, the UE comprising:

a transceiver configured to transmit and receive a radio signal; and a processor functionally connected to the transceiver, wherein the processor is configured to:

control the transceiver to receive, from a base station (BS), a radio resource control (RRC) signaling related to a DRS Measurement Timing Configuration (DMTC), control the transceiver to receive, from one or more cells, the DRS in a DRS occasion of a DRS measurement window for a specific carrier frequency based on the received RRC signaling, perform a measurement using the received DRS, and report, to the BS, a result of the measurement, wherein the RRC signaling includes DRS measurement offset information related to a starting point of the DRS measurement window and DRS measurement period information related to an occurrence period of the DRS measurement window, wherein a first subframe of the DRS measurement window is determined based on the DRS measurement offset information and the DRS measurement period information, and wherein a period of the DRS measurement window includes 40ms, 80ms and 160ms.

* * * * *